US005524099A

United States Patent [19]

Rickman et al.

[11] Patent Number: 5,524,099

[45] Date of Patent: Jun. 4, 1996

[54] INTRUSION DETECTOR OPERATING MODE SELECTION SYSTEM

[75] Inventors: Stephen A. Rickman, Loomis; Richard A. Johnson, Folsom; Richard J. Hess, Woodland, all of Calif.

[73] Assignee: C & K Systems, Inc., Calif.

[21] Appl. No.: 249,149

[22] Filed: May 25, 1994

[51] Int. Cl.[6] .................................................... H04B 17/00

[52] U.S. Cl. ........................... 367/13; 340/508; 340/517; 340/541

[58] Field of Search .................................... 340/508, 517, 340/541; 367/13

[56] References Cited

U.S. PATENT DOCUMENTS 4,367,458 1/1983 Hackett .................................. 340/539
4,987,402 1/1991 Nykerk .................................... 340/426
5,109,216 4/1992 Yarbrough et al. ...................... 340/544

OTHER PUBLICATIONS

GlassTrek Instruction Manual (one page), Pirotec Technologies.

*Primary Examiner*—J. Woodrow Eldred
*Attorney, Agent, or Firm*—Limbach & Limbach; Alan S. Hodes

[57] ABSTRACT

An intrusion detector operating mode selection circuit sets an intrusion detector operating mode responsive to an encoded acoustic signal. An acoustic signal decoder receives an encoded acoustic signal and generates a mode selection signal in response thereto. The encoded acoustic signal is a plurality of spaced-apart acoustic pulses encoded by the relative inter-pulse timing of the spaced-apart pulses. A mode of the intrusion detector is set responsive to the mode selection signal.

29 Claims, 20 Drawing Sheets

| | | |
|---|---|---|
| FIG. 6A | FIG. 6B | FIG. 6C |
| FIG. 6D | FIG. 6E | FIG. 6F |
| FIG. 6G | FIG. 6H | |

KEY TO FIG. 6

KEY TO FIG. 7

INTRUSION DETECTOR OPERATING MODE SELECTION SYSTEM

TECHNICAL FIELD OF THE INVENTION

The present invention relates to an intrusion detector operating mode selection circuit, and in particular, to an intrusion detector operating mode selection circuit which sets an intrusion detector operating mode responsive to an encoded acoustic signal.

BACKGROUND OF THE INVENTION

An intrusion detector is a device which generates an alarm signal when the detector detects unauthorized activity in or around a protected volume of space. The detector may be, for example, a motion sensor or a glass-break sensor.

After an installer installs the detector, the installer tests the detector to ensure that it is functioning properly. To test a motion sensor, for example, the installer walks throughout the motion sensor's field of view to cause the generation of a sensing signal. In response to the sensing signal, a detected-event indicator such as an LED may be illuminated.

To perform the test, the installer may be required to switch the detector into a test mode. This is conventionally done by opening the housing of the detector and installing a jumper or actuating a switch. However, many detectors are mounted in hard- to-reach locations, such as on ceilings. Switching such a hard-to-reach detector into a test mode is inconvenient, or even dangerous, for the installer.

Therefore, it is desirable to be able to switch the detector into a test mode remotely, obviating the need to open, or even physically contact, the detector. One prior art attempt at providing remote mode switching is the GlassTrek 450/450-S manufactured by Pirotec Technologies of St-Eustache, Quebec, Canada. An installer switches the GlassTrek 450/450S into a test mode by moving a switch on a Testtrek 1 glass break simulator to a Start/End position, pointing the Testtrek 1 at the GlassTrek 450/450-S, and pressing and holding a push switch on the Testtrek 1 for about three seconds. The GlassTrek 450/450-S switches into a test mode at the conclusion of the three seconds.

It appears that the TestTrek 1 remote unit emits a series of three continuous tones during the three second period over which the push switch is pressed and held and that the GlassTrek 450/450-S decodes the frequency, amplitude, and/or duration of the three continuous tones.

The prior art attempt has several drawbacks. First, substantial time is required for generation of the three continuous tones. During this time, movement of the Testtrek 1 remote unit obscures the frequency, amplitude and/or duration of the emitted tones.

Another problem in designing an acoustic signaling system for use in rooms is distortion of the received signal by reflections from the walls, floor and ceiling of the room. Because of such reflections, the prior art methods of modulating a signal onto a carrier waveform do not work well. The signal received by the microphone consists of the direct sound summed with time-delayed replicas along reflected paths. If the original emitted signal is a sound carrier amplitude- or frequency-modulated by a code waveform then the replicas interfere with it constructively or destructively. This effect is known as "multipath distortion" in radio-frequency signalling. If the delays in the reflected path signals are small, multipath distortion causes unpredictable amplitude variations in the received signal. If the delays are large compared with the duration of the code, not only amplitude variations but echoes will occur. As with echoes perceived by ear, the original signal may be made unintelligible to the receiver by the superposition of multiple overlapping replicas.

Multipath distortion is much more of a problem in acoustic signalling than it is in signalling methods based on electromagnetic waves, for two reasons. First, the speed of sound in air is much less than the speed of electromagnetic waves. Consequently, reflective paths in an ordinary room may introduce delays in the tens of milliseconds. Secondly, surfaces in ordinary rooms usually are reflective enough to allow significant secondary reflections of sound waves. This characteristic leads to reverberation, which is a condition of sustained reflections randomly distributed throughout the room.

Because of the distortion imposed on acoustic signals by multipath distortion in rooms, the prior art techniques of signaling do not work well in this situation. The prior art techniques involve modulating a carrier signal with a lower frequency waveform containing the intelligence. In the common techniques, such as continuous or discrete amplitude or frequency modulation, the carrier is "on" for a substantial portion of the transmission, varying typically from 50% to 100%. In acoustic signaling, the problem is that while the carrier is on, sound energy is radiated into the room, where it contributes to the system of reflections and reverberation, which then cause distortion at the receiver.

SUMMARY OF THE INVENTION

The present invention is an intrusion detector operating mode selection circuit which sets an intrusion detector operating mode responsive to an encoded acoustic signal. Since the encoded acoustic signal may be transmitted to the intrusion detector from a remote location, the intrusion detector operating mode selection circuit provides a safe and convenient way of changing the intrusion detector operating mode.

The acoustic signal decoding means receives an encoded acoustic signal and generates a mode selection signal in response thereto. The encoded acoustic signal is a plurality of spaced-apart acoustic pulses encoded by the relative inter-pulse timing of the spaced-apart pulses. A mode setting means sets a mode of the intrusion detector responsive to the mode selection signal.

A better understanding of the features and advantages of the invention will be obtained by reference to the following detailed description and accompanying drawings which set forth an illustrative embodiment in which the principles of the invention are utilized.

DETAILED DESCRIPTION OF THE INVENTION

Figure 1:
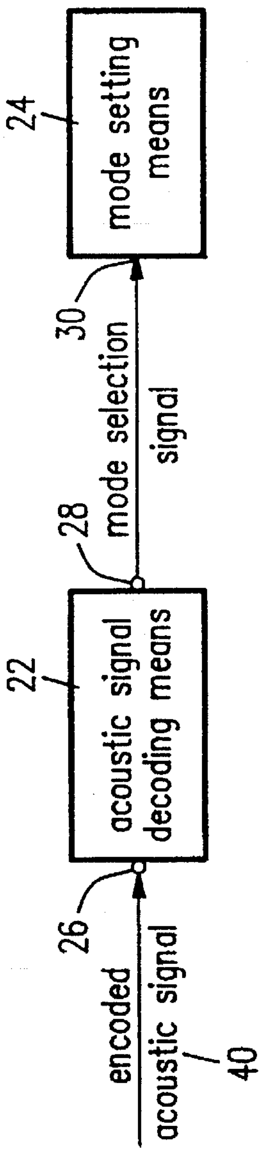
FIG. 1 is a block diagram of an intrusion detector mode selection circuit in accordance with the present invention.

As shown in the functional block diagram of FIG. 1, an intrusion detector mode selection circuit 20 comprises an acoustic signal decoding means 22 coupled to a mode setting means 24.

The acoustic signal decoding means 22 receives an encoded acoustic signal 40 at a terminal 26. In response to the encoded acoustic signal, the acoustic signal decoding means 22 produces a mode selection signal at an output terminal 28. The mode setting means 24 sets the mode of operation of an intrusion detector (not shown) responsive to the mode selection signal.

Figure 2:
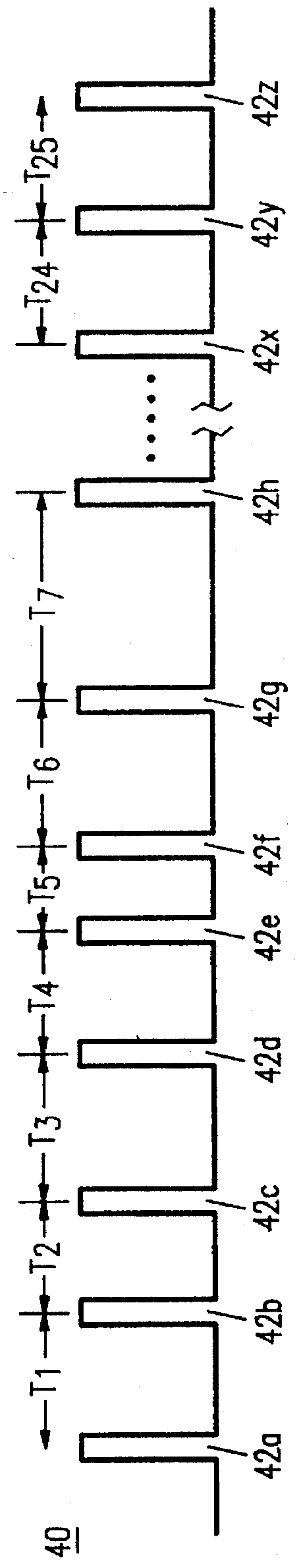
FIG. 2 shows an encoded acoustic signal waveform.

FIG. 2 shows an encoded acoustic signal waveform. The encoded acoustic signal 40 comprises a plurality of spaced-apart acoustic pulses 42*a*–42*z*. Referring to FIG. 2, the acoustic pulse 42*b* is spaced apart from the acoustic pulse 42*a* by a time $T_1$, and the acoustic pulse 42*c* is spaced apart from the acoustic pulse 42*b* by a time $T_2$.

Figure 3:
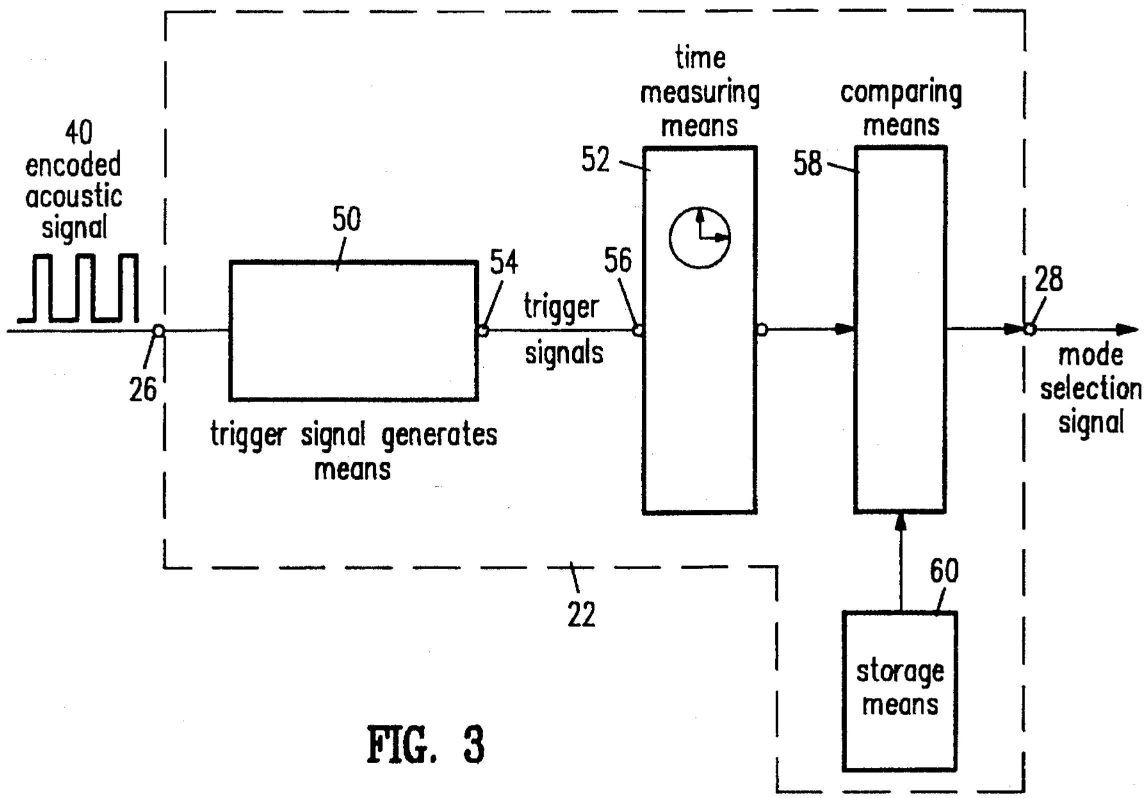
FIG. 3 shows the acoustic signal decoding means of the intrusion detector mode selection circuit of FIG. 1 in more detail.

The acoustic signal decoding means 22 of the intrusion detector mode selection circuit 20 is shown in more detail in FIG. 3. The acoustic signal decoding means 22 comprises a trigger signal generating means 50 coupled to a time measuring means 52. The trigger signal generating means 50 generates a trigger signal at a terminal 54 for each acoustic pulse 42*a*–42*z* of the acoustic signal 40 received at the terminal 26. The time measuring means 52 receives the trigger signals at a terminal 56 coupled to the terminal 54. The time measuring means 52 measures the times between the trigger signals.

The acoustic signal decoding means 22 further comprises a comparing means 58. The comparing means 58 compares the measured times, measured by the time measuring means 52, to respective a priori determined time values. The a priori determined time values are stored in a memory 60. Based on the results of the comparison, the acoustic signal decoding means 22 produces a mode selection signal at the output terminal 28. In particular, if the measured times are substantially equal to the a priori determined times stored in the memory, the acoustic signal decoding means 22 produces the mode selection signal.

The times may be compared, for example, by time tagging trigger signals as they occur and comparing the time tags of the trigger signals to the respective a priori determined time values. Alternatively, a timeout signal may be used to signal the expiration of particular time periods used in decoding an acoustic signal.

Figure 4:
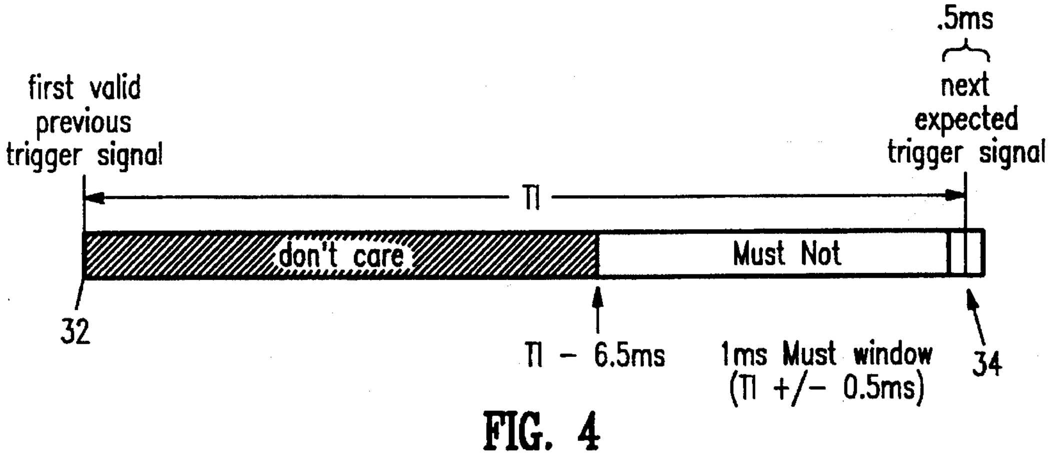
FIG. 4 shows a particular scheme used by the acoustic signal decoding means of FIGS. 1 and 3 to gain immunity to false signal decoding.

FIG. 4 shows a particular scheme used by the acoustic signal decoding means 22 to gain immunity to false signal decoding. The object of the scheme is to correctly recognize an encoded acoustic signal consisting of a first pulse and a second pulse at a time T1 after the first pulse. In the example of FIG. 4, the first pulse occurs at a time indicated by 32, and the second pulse is anticipated to occur at a time indicated by 34. After the acoustic signal decoding means 22 receives a first trigger signal at the time 32, it allows for (i.e. ignores) reflections of the first trigger signal by setting a first period of time for which it ignores subsequently received trigger signals. This first period of time is labelled "don't care" in FIG. 4.

Upon expiration of the "don't care" period of time, the acoustic signal decoding means 22 sets a second period of time, labelled "must not" in FIG. 4. The "must not" period is set to terminate before an anticipated trigger signal, representative of an acoustic pulse anticipated to be received consecutive to the acoustic pulse causing the first trigger signal, is produced by the trigger signal generation means. If the acoustic signal decoding means 22 receives a trigger signal during the "must not" period of time, it resets the "don't care" period. That is, the acoustic signal decoding means 22 disqualifies the signal thus far received and awaits another trigger signal.

If the "don't care" period has not been reset, upon the expiration of the "must not" time period the acoustic signal decoding means 22 sets a third period, labelled "next expected trigger signal" in FIG. 4. The "next expected trigger signal" period commences upon expiration of the "must not" time period and terminates after an a priori determined first window of time around the time 34 at which the anticipated trigger signal is to be received. If the anticipated trigger signal is generated during the "next expected trigger signal" period, the acoustic signal decoding means 22 produces a mode selection signal.

Figure 5:
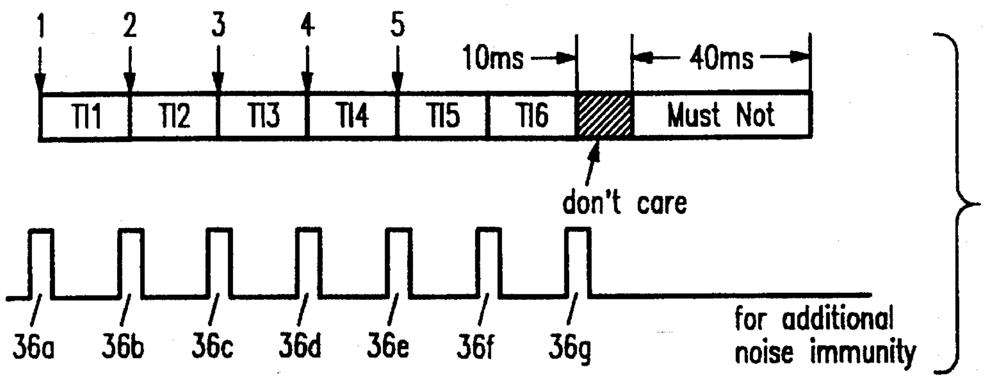
FIG. 5 shows a scheme for decoding an encoded acoustic signal which comprises seven acoustic pulses.
Figure 6H:
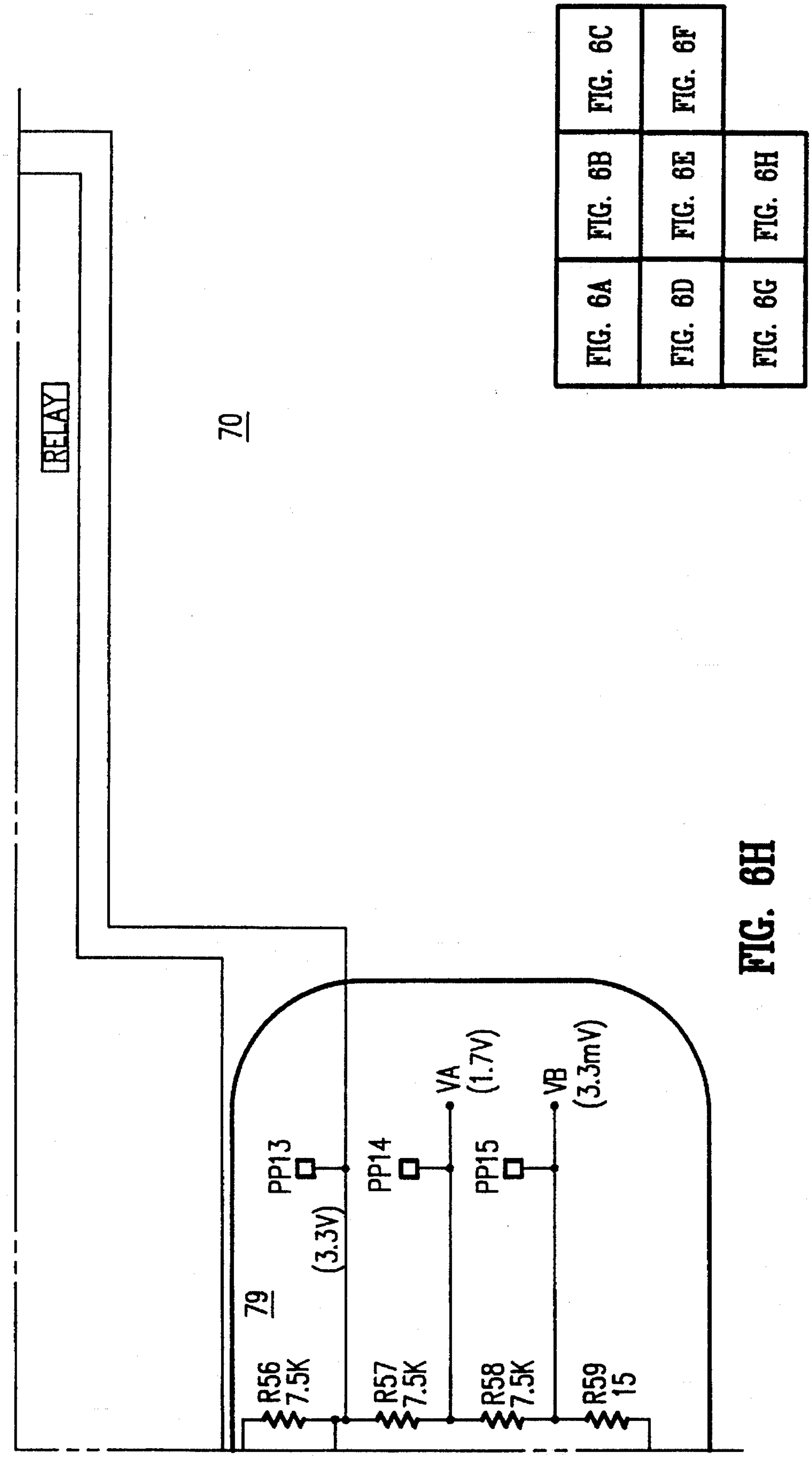
FIG. 6 is a schematic diagram of a glass break detector with which the mode selection circuit of FIG. 1 may be used.
Figure 6A:
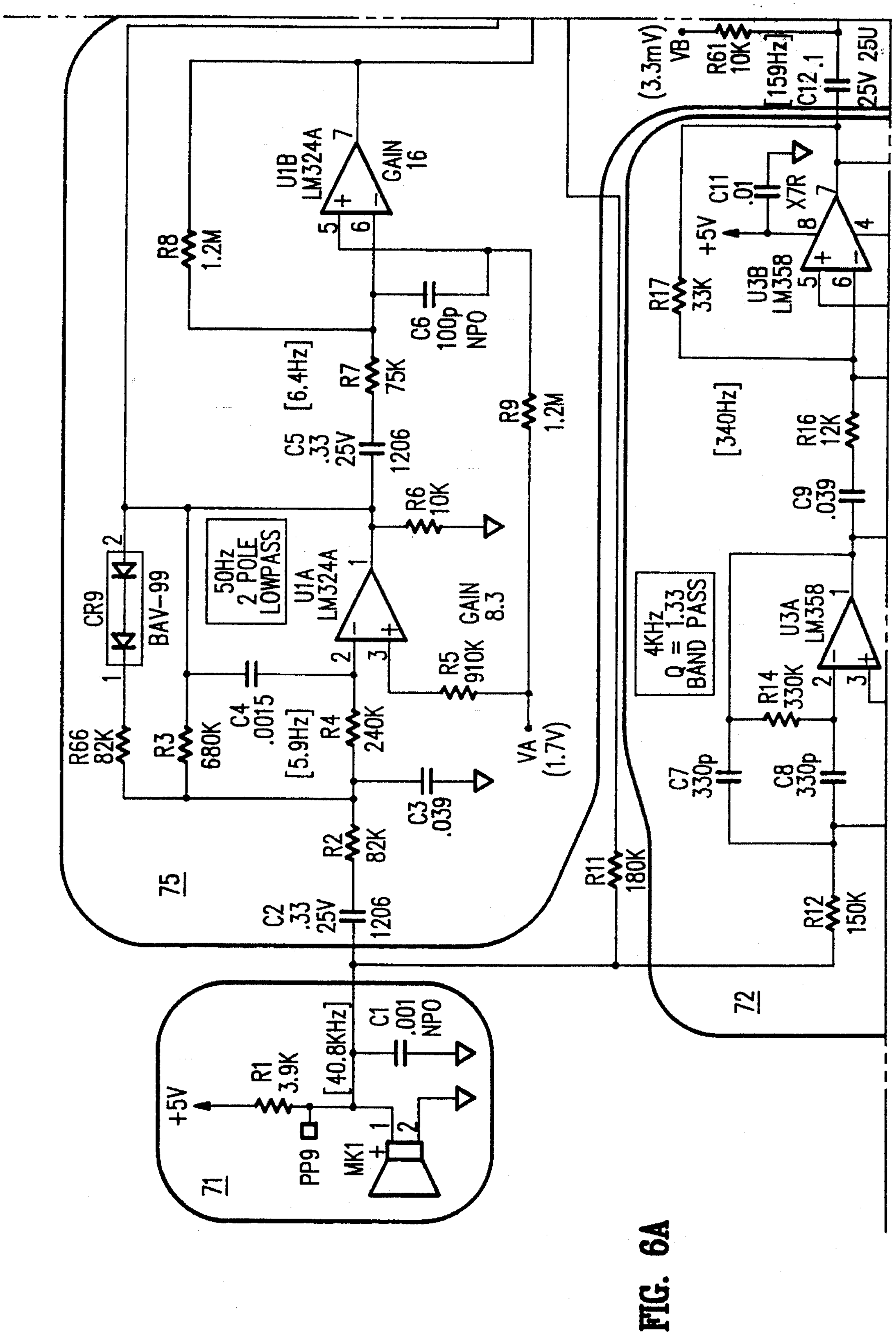
Figure 6B:
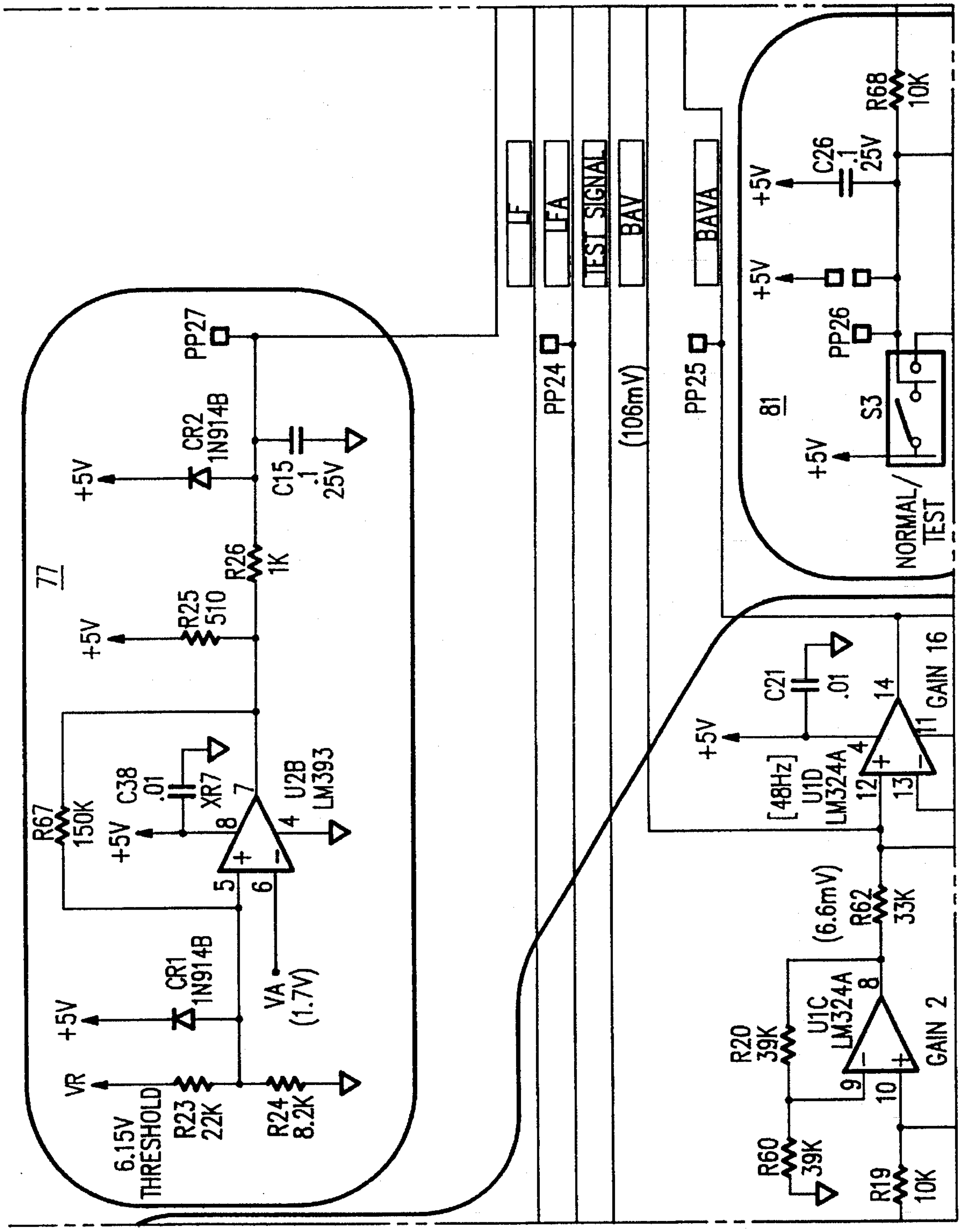
Figure 6C:
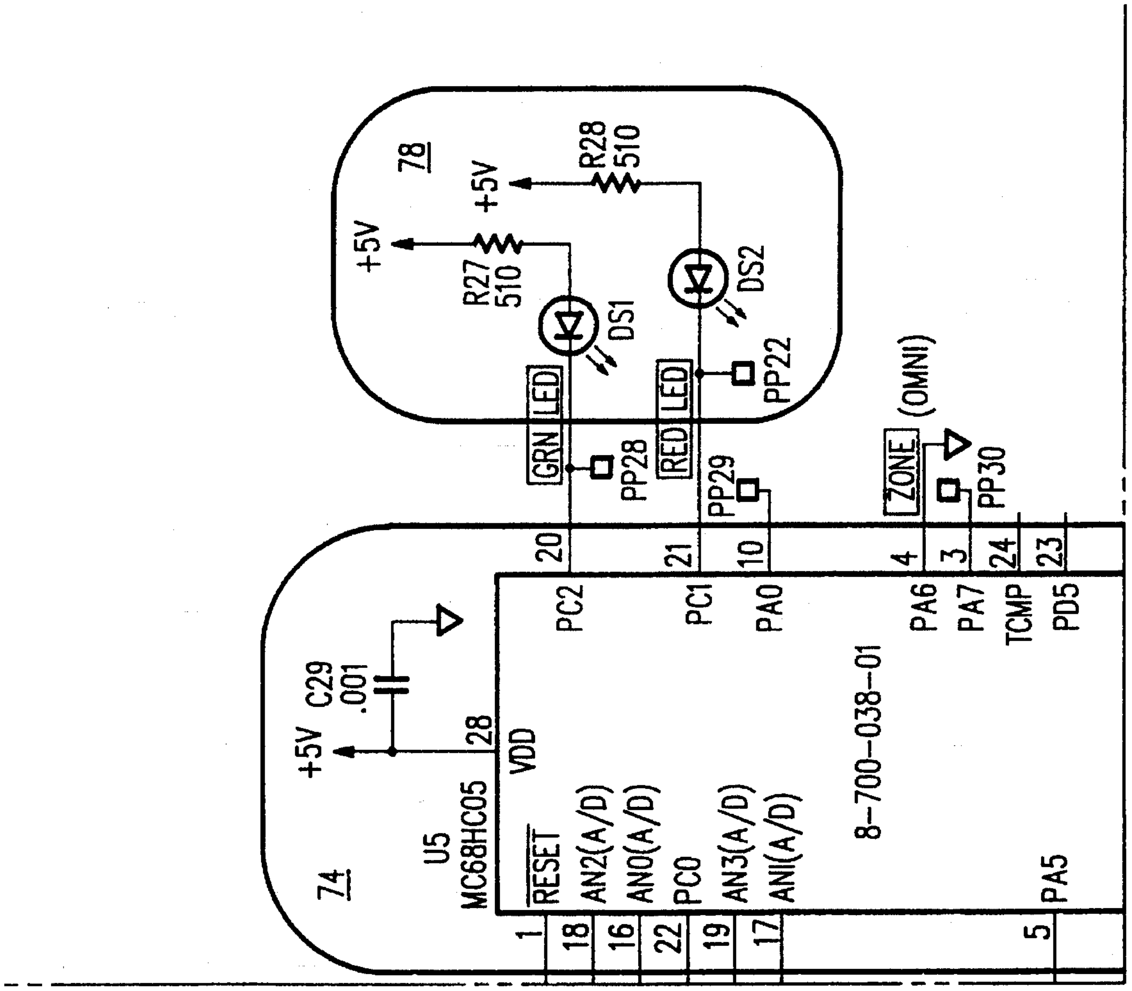
Figure 6D:
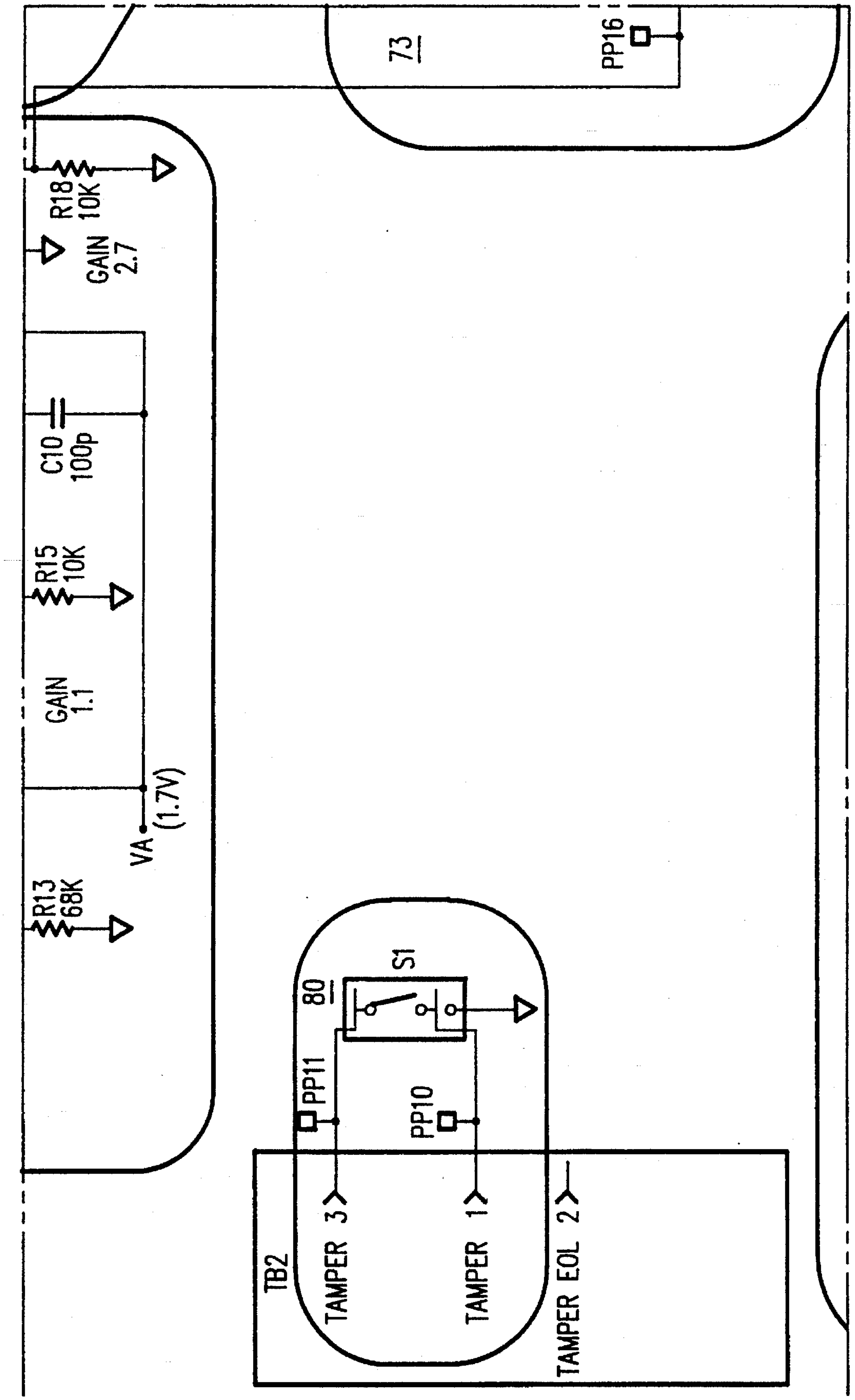
Figure 6E:
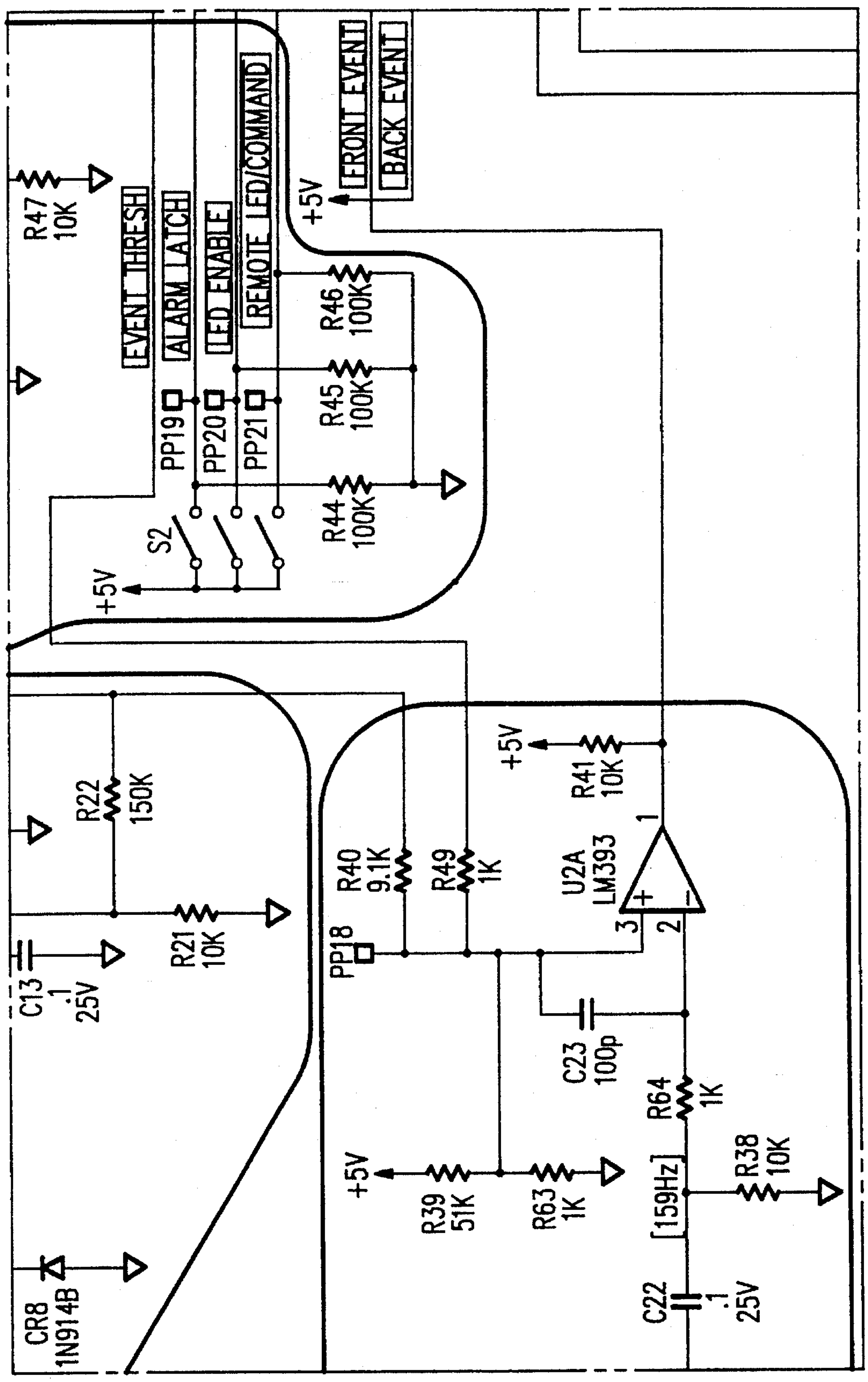
Figure 6F:
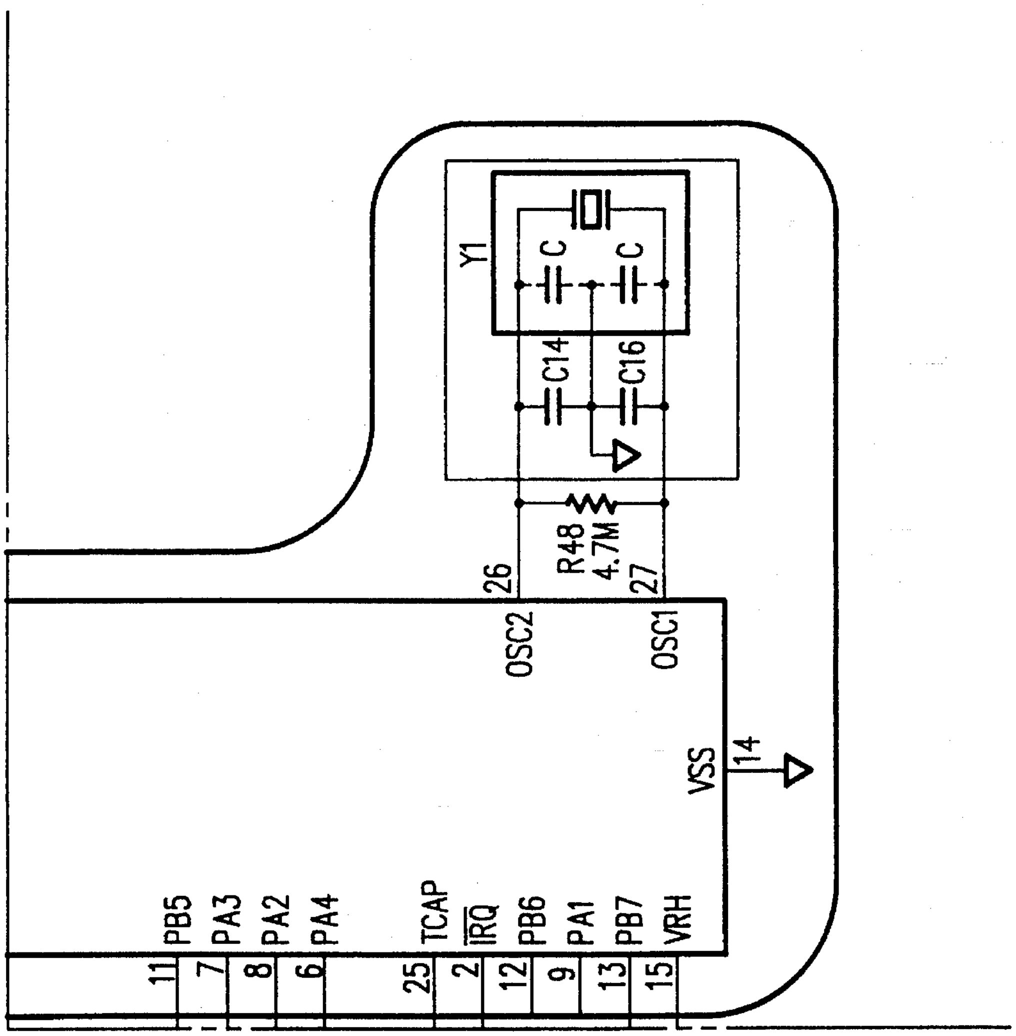
Figure 6G:
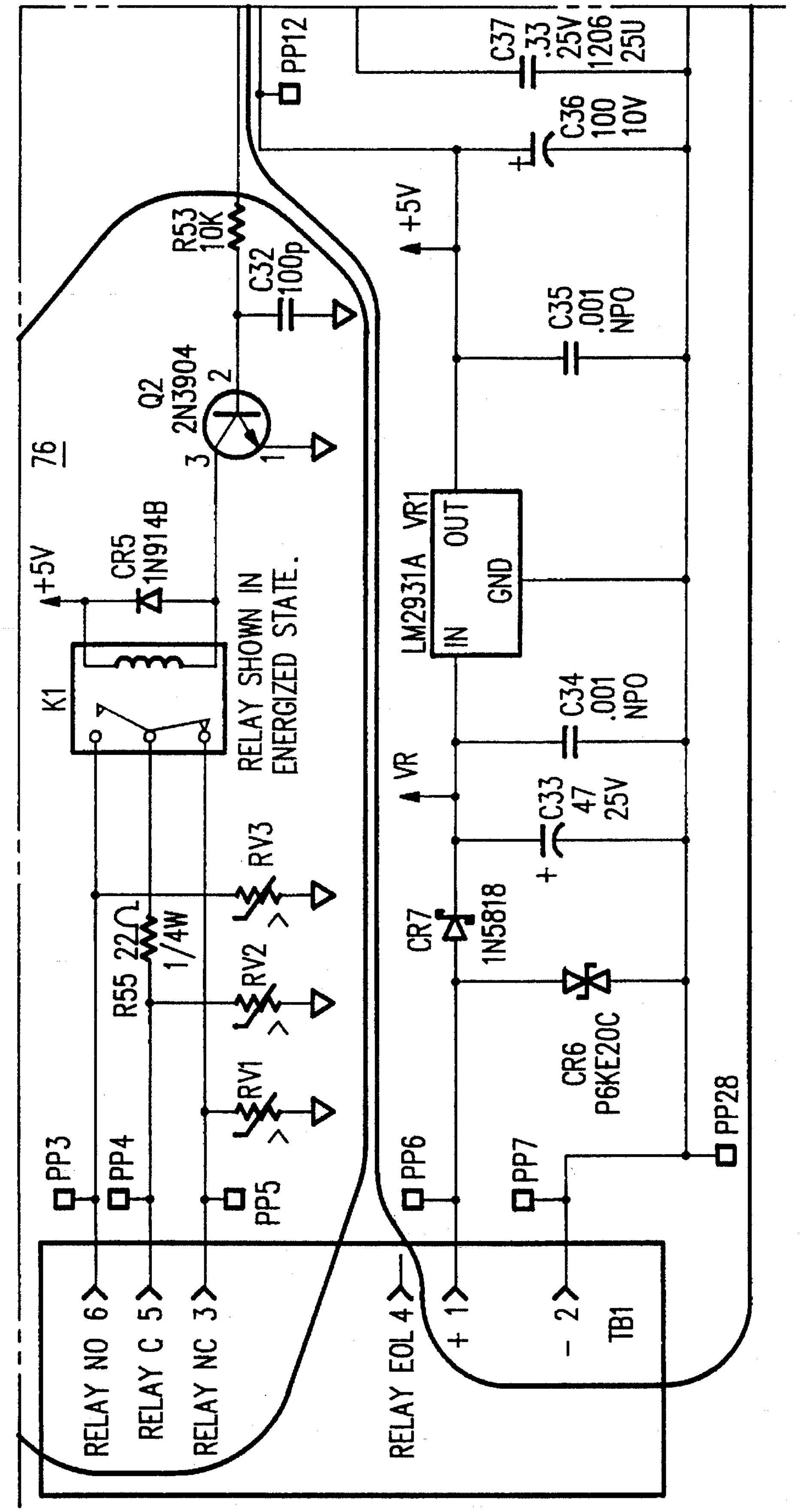
Figure 7A:
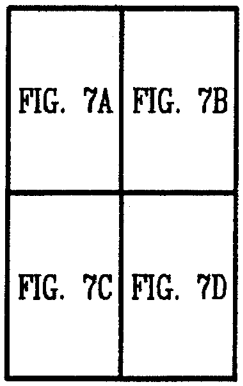
FIG. 7 is a flowchart of software executing in the microcontroller of the glass break detector of FIG. 6.
Figure 7A:
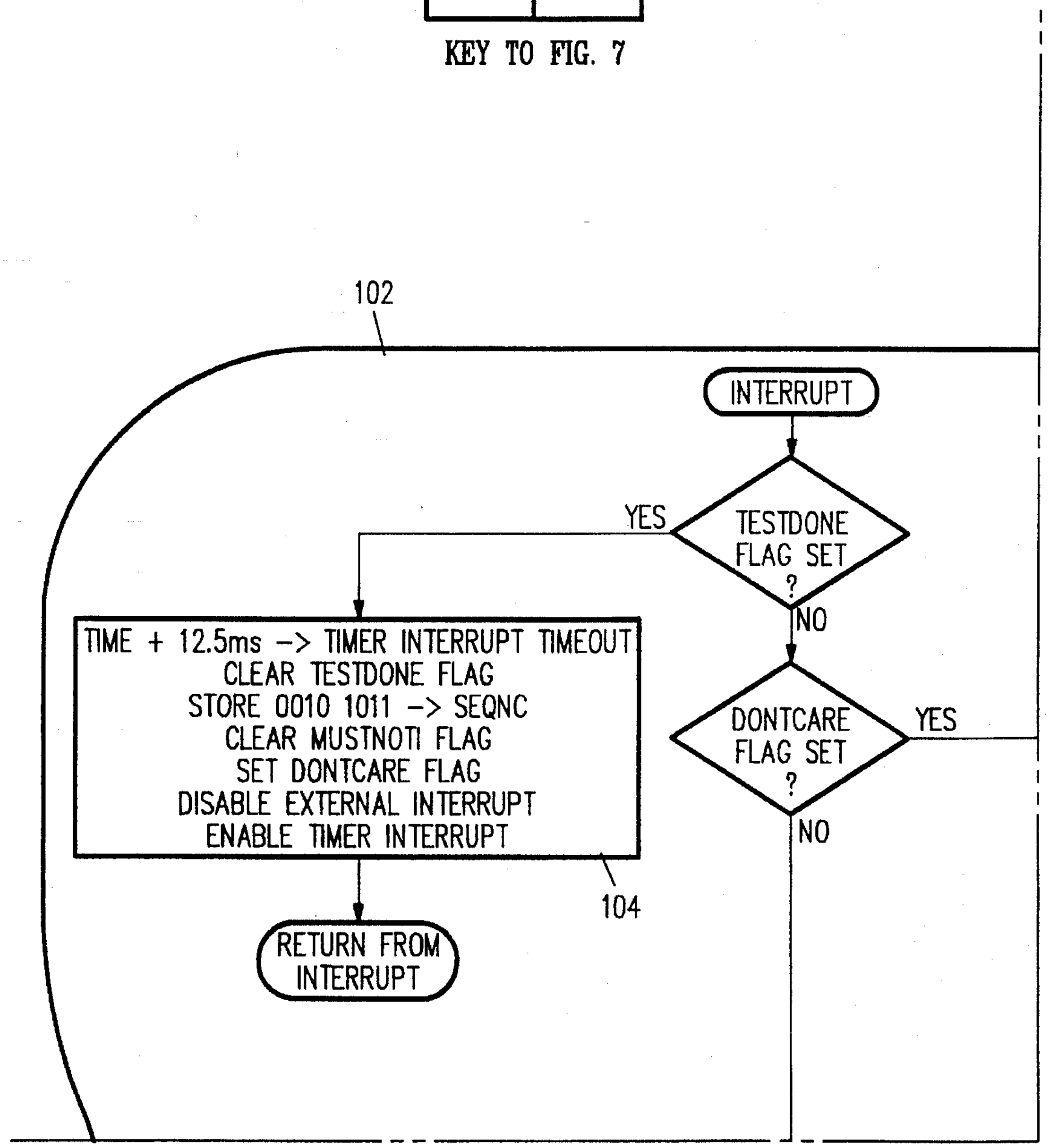
Figure 7B:
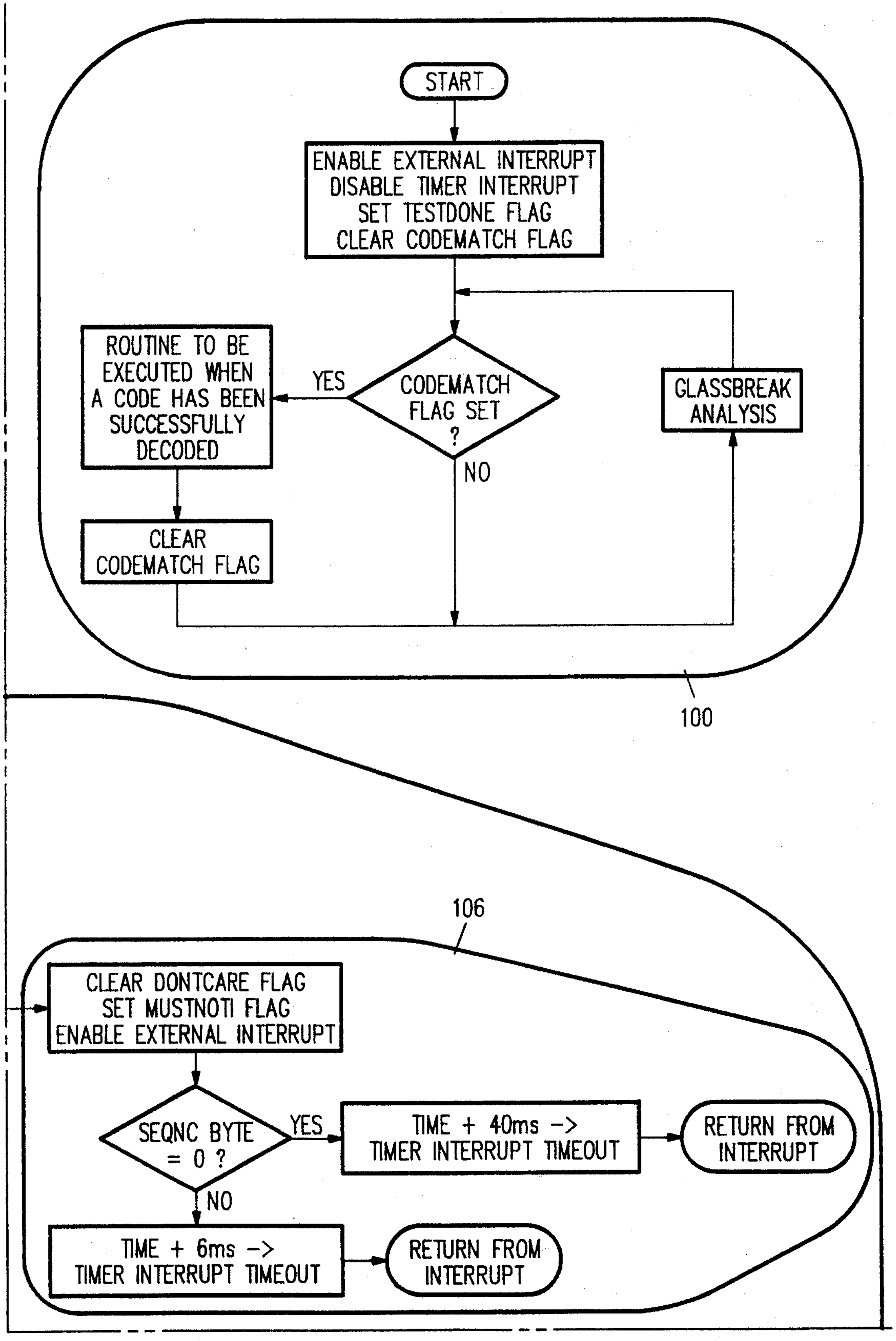
Figure 7C:
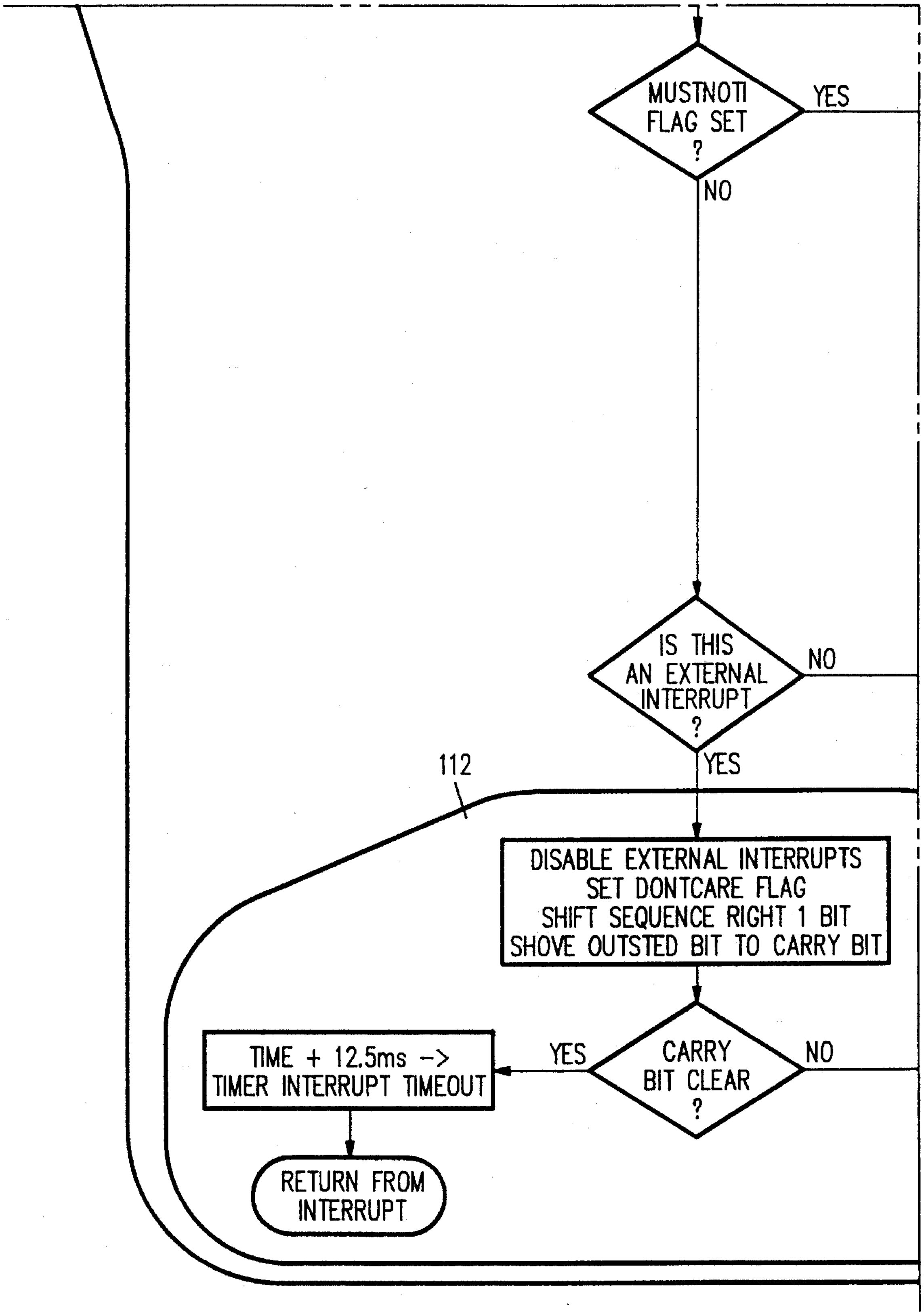
Figure 7D:
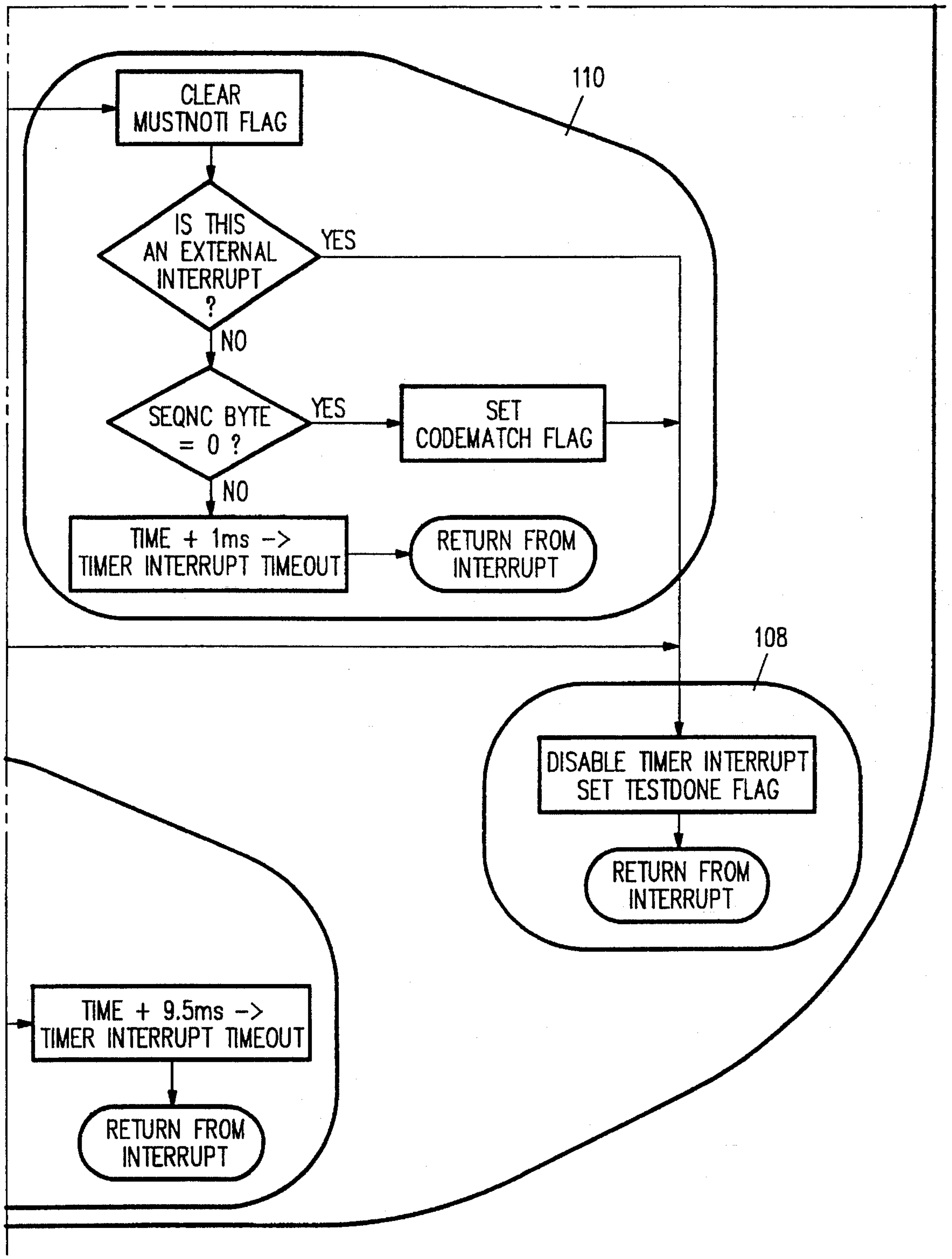
Figure 8F:
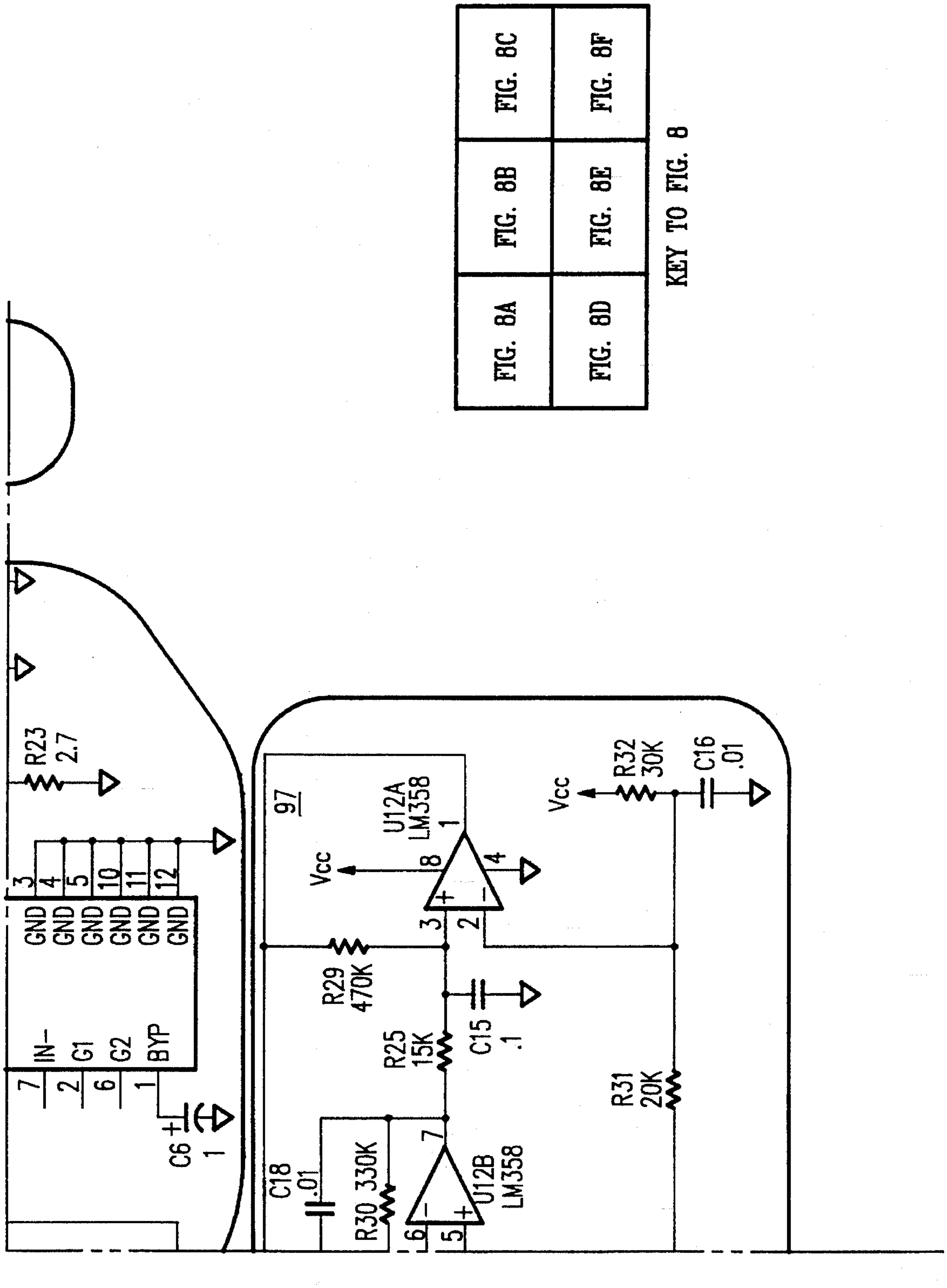
FIG. 8 is a schematic diagram of an acoustic signal encoding device in accordance with the present invention.
Figure 8A:
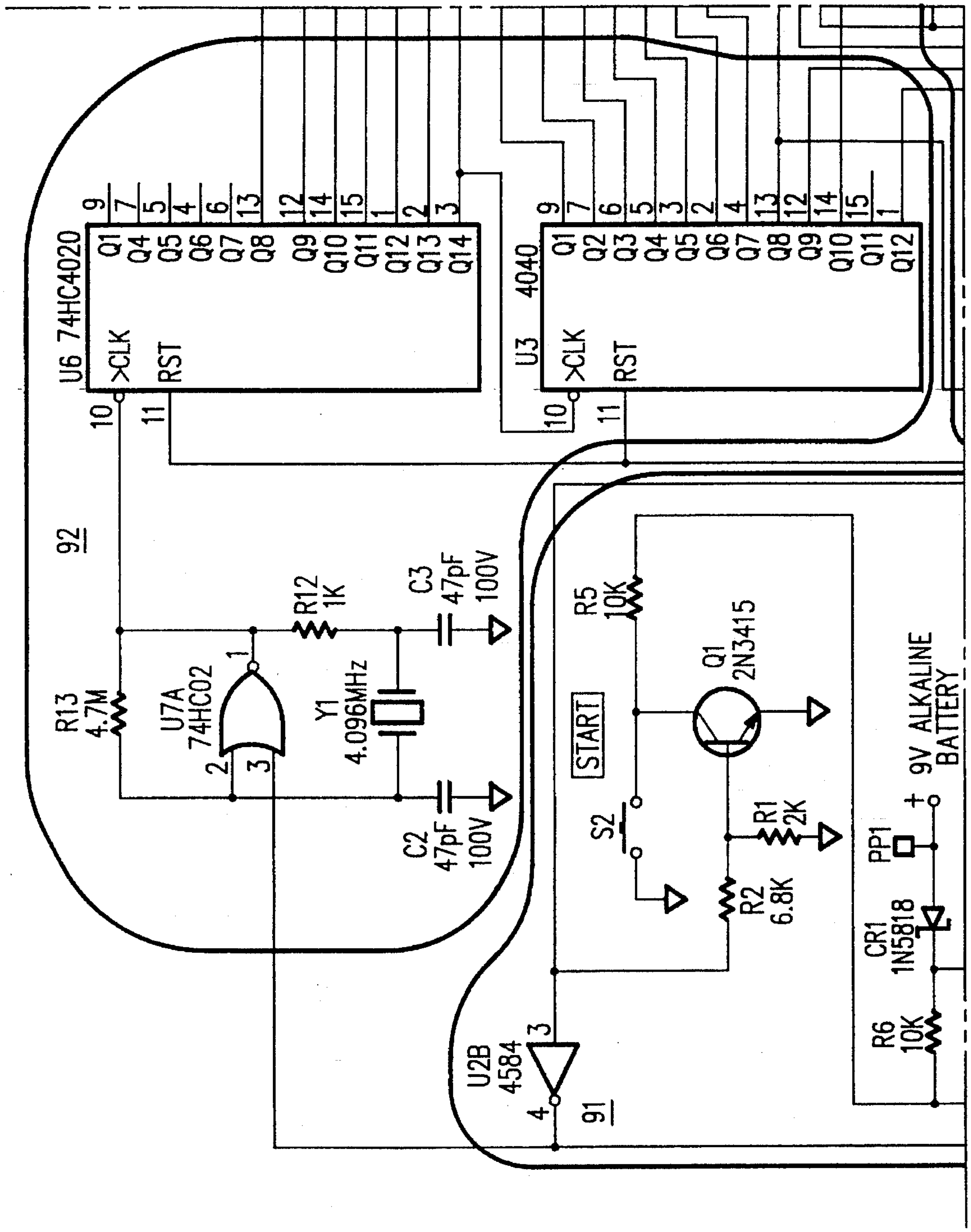
Figure 8B:
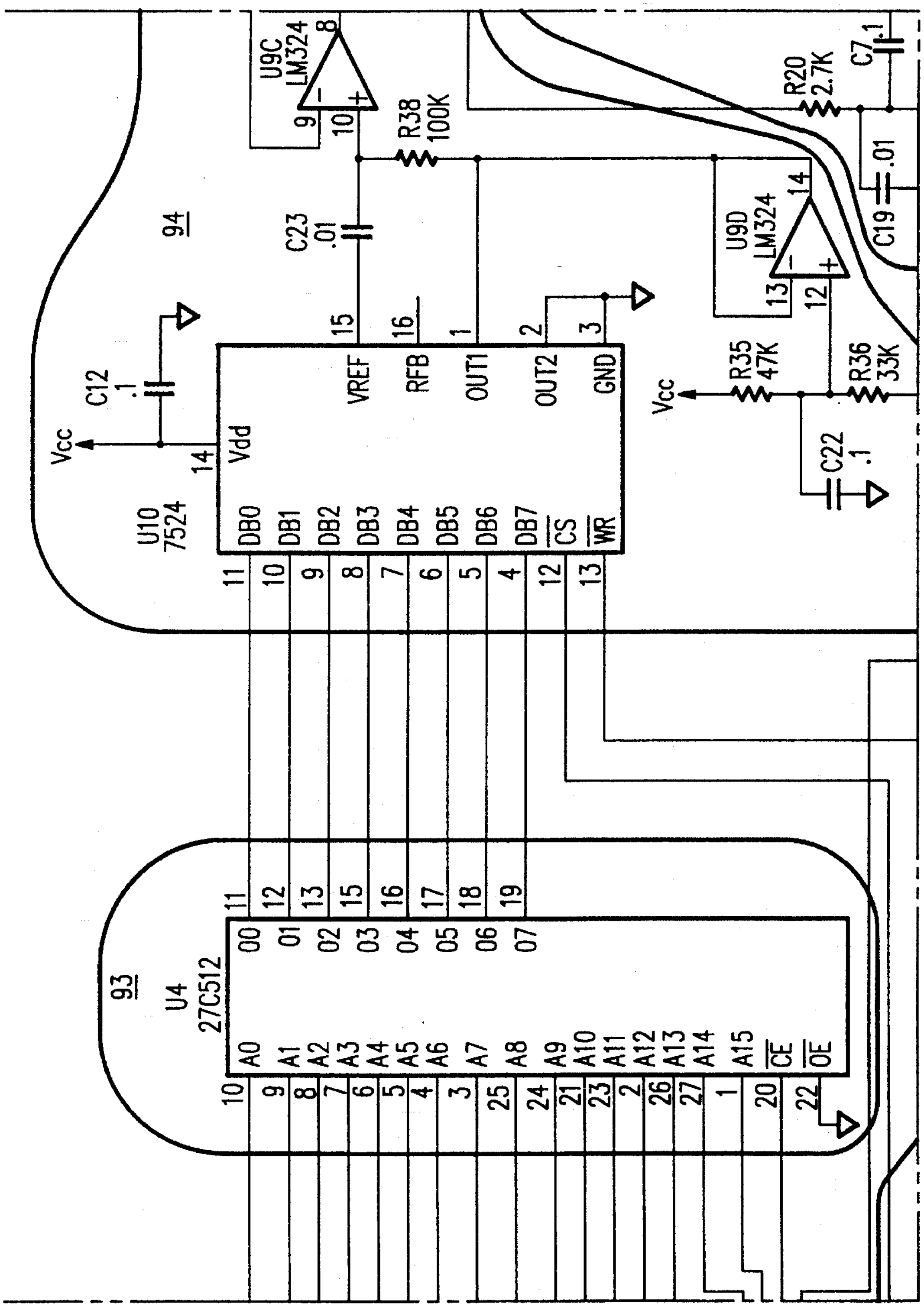
Figure 8C:
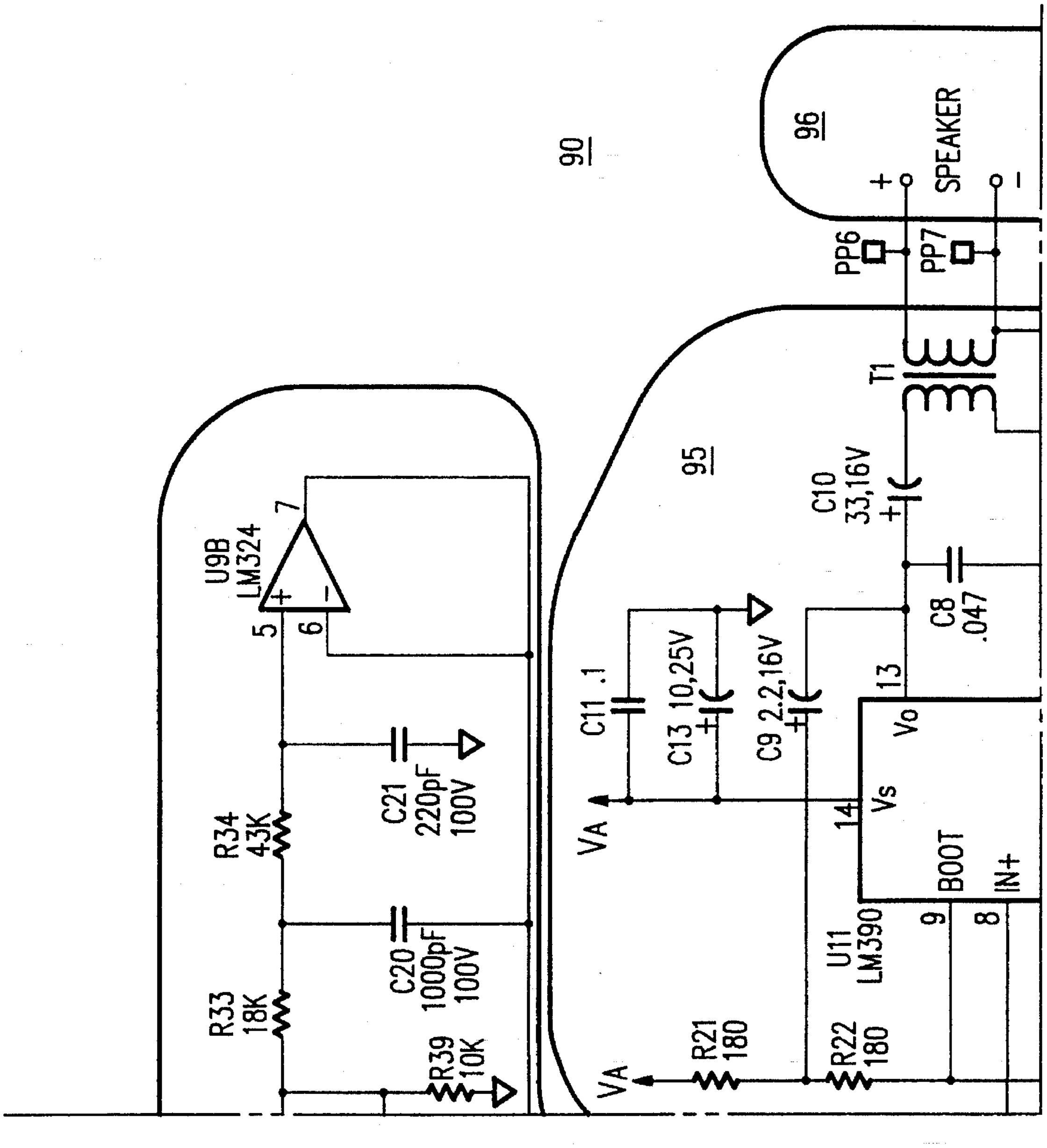
Figure 8D:
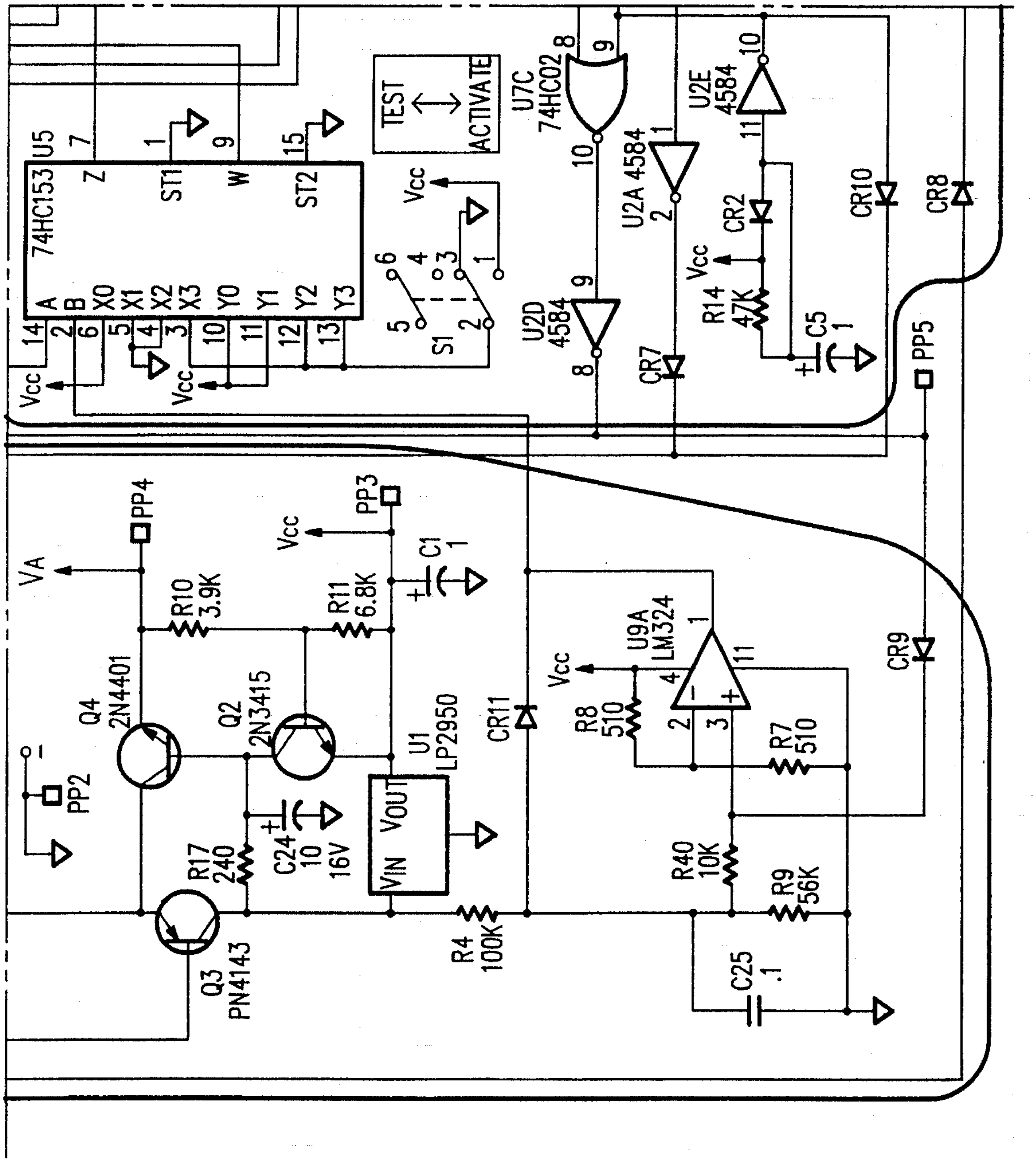
Figure 8E:
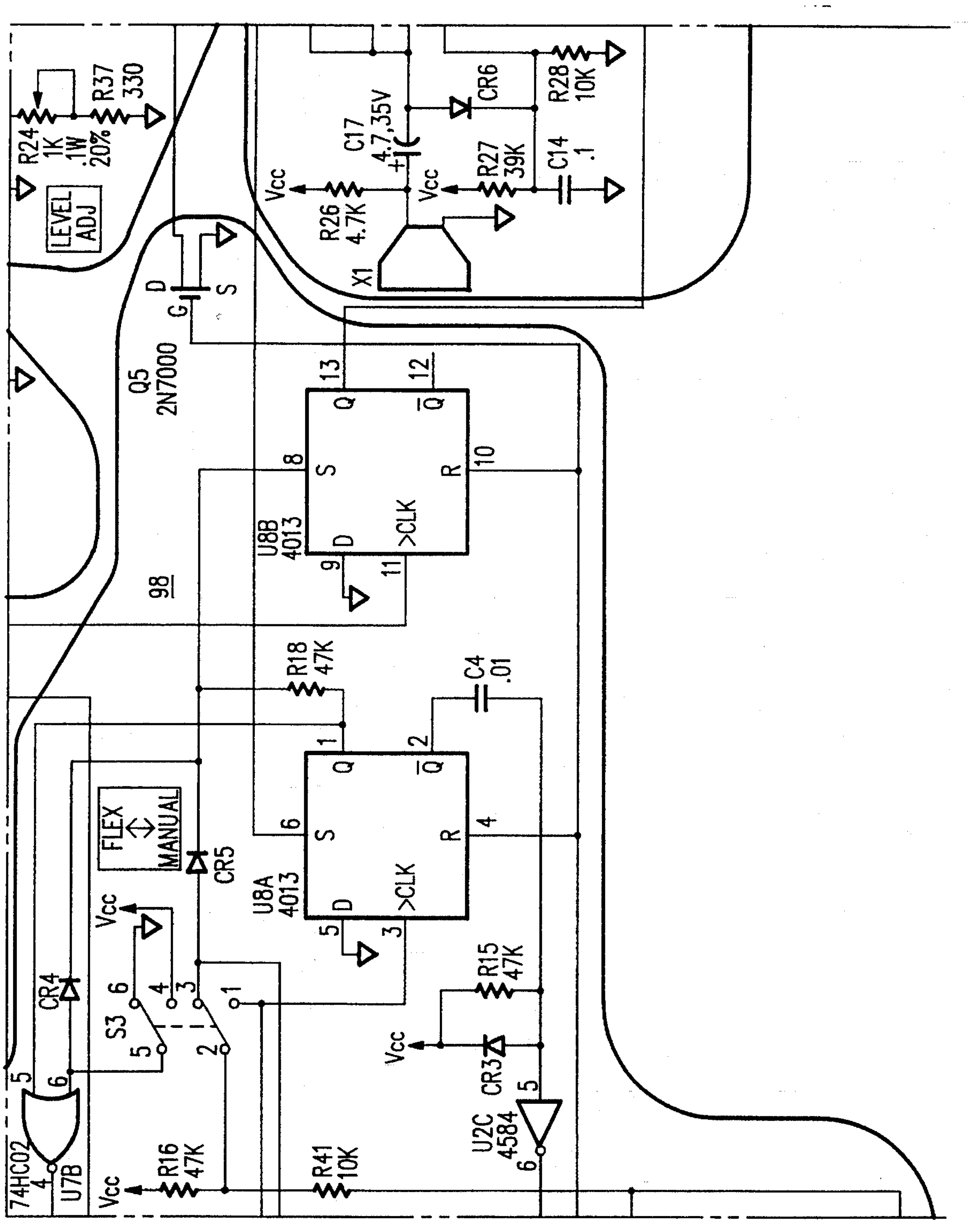

In a preferred embodiment in accordance with the present invention, the acoustic signal decoder means 22 recognizes an encoded acoustic signal which comprises a plurality of spaced-apart acoustic pulses. For example, FIG. 5 shows the scheme for decoding an encoded acoustic signal which comprises seven acoustic pulses 36*a*–36*g*, spaced apart by times TI1–TI6, respectively. Each anticipated trigger signal 36*a*–36*f* received during the "next expected trigger signal" period, except the last trigger signal 36*g* anticipated to be received of the encoded acoustic signal, causes the acoustic signal decoding means 22 to reset the first time period. After the plurality of acoustic pulses 36*a*–36*g* are received and decoded in this manner, the acoustic signal decoding means 22 produces a mode selection signal.

Finally, for increased noise immunity, after the last trigger signal anticipated to be received is actually received, a fourth period may be set, labelled as "don't care" in FIG. 5. Any trigger signal received during the fourth ("don't care") period is ignored to allow for reflections of the last anticipated acoustic pulse.

Upon expiration of the fourth period of time, the acoustic signal decoding means 22 sets a fifth period of time, labelled "must not" in FIG. 5, to terminate upon the expiration of a second a priori determined window of time. If the acoustic signal decoding means 22 receives a trigger signal during the fifth ("must not") period of time, it resets the first period. That is, the acoustic signal decoding means 22 disqualifies the signal thus far received and awaits another trigger signal.

It may be desirable to randomly access one of a plurality of modes of operation of the intrusion detector. In this case, the encoded acoustic signal 40 is encoded to correspond to the desired mode. That is, several different sets of a priori determined time values are stored in the memory 60, each set corresponding to a different operational mode, and the comparing means compares the measured times between the trigger signal corresponding to acoustic pulses to the several different sets of a priori determined time values. The acoustic signal decoding means 22 produces a mode selection signal indicative of the desired mode in accordance with the particular set of a priori determined time values matched by the measured times.

FIG. 6 is a schematic diagram of a glass break detector 70 with which the mode selection circuit 20 may be used. A microphone 71 is a miniature electret device with a frequency range of approximately 20 Hz to 20 kHz and a basic sensitivity of −62 dB re 1 V per microbar (at 1 kHz). The microphone 71 drives a bandpass amplifier 72, built around operational amplifiers U3A and U3B. Amplifier U3A implements an active filter with a center frequency of 4 kHz and a Q of 1.33. The gain of this active filter at 4 kHz is approximately 1.1 V/V The output of the active filter is AC-coupled to a following amplifier built around U3B. The gain of the following amplifier is approximately 2.8 V/V over a frequency range of 340 Hz to 20 kHz. Thus the complete bandpass amplifier has a gain of 3 V/V at the center frequency of 4 kHz. This center frequency is chosen for the bandpass amplifier because research has shown that it is consistently present in glass break sounds for all types of glass and all conditions of room acoustics. Since the amplifier also must handle the encoded acoustic signal, the center frequency of the encoded acoustic signal is also set to 4 kHz.

Following the bandpass amplifier, the signal is ac-coupled to a threshold detector 73, built around an analog comparator U2A. The comparator threshold input at pin 3 is normally fixed at 0.1 V by resistors R39 and R63.

The primary purpose of the threshold detector is to signal a microcontroller 74 when an acoustic event occurs which may be a glass break signal. However, the threshold detector is also the means by which the microcontroller recognizes the acoustic pulses of the encoded acoustic signal. Within a range of approximately ten feet, a pulse has sufficient amplitude to trigger the threshold detector and produce a trigger signal at the microcontroller where it connects at pin 25. Software in the microcontroller implements the scheme shown in FIGS. 4 and 5 for decoding an encoded acoustic signal.

Pin 25 is an external interrupt connection to the microcontroller, sensitive to transitions from a high logic level (approximately +5 V) to a low logic level (approximately 0 V). The microcontroller responds to an interrupt within six microseconds. Upon an interrupt during a period when a signal is not already being processed, the microcontroller executes two tasks simultaneously. First, it begins converting analog inputs from circuit block 75 to digital signals and processing them to determine if a glass break alarm is qualified. Secondly, it starts an internal timer to count out the 12.5 millisecond "don't care", segment of the first interpulse duration.

The remainder of the circuit blocks are associated with the glass break detection function and are not essential to the sound code recognition system. They are briefly described here.

Circuit block 75 processes the signal from the microphone to extract information used by the microcontroller to determine if a sound in the coverage zone is characteristic of glass breakage. The processed signals are applied to the microcontroller through four analog-to-digital inputs.

Circuit block 76 is the final alarm output. If the microcontroller determines that all alarm conditions are satisfied, it places a low logic level on normally-high pin 13, which turns off transistor Q2. This action de-energizes the relay, which constitutes an alarm condition.

Circuit block 77 is a power-up reset circuit. It holds the microcontroller in reset until the input supply voltage has reached a satisfactory level, and forces a reset if the supply voltage drops below that level.

Circuit block 78 is a pair of indicator LED's used to indicate status of the device, including processing of a sound event, alarm, trouble, and test mode.

Circuit block 79 is the input supply voltage regulator and filter. It also includes voltage dividers which reference voltages for use at various points in other circuit blocks.

Circuit block 80 is a tamper-indicating switch which is activated when the cover of the device is opened. Circuit block 81 contains configuration and mode select switches.

A flowchart of the microcontroller software is shown in FIG. 7. The signal decoding logic takes place in an interrupt routine 102 activated either by threshold detector asserting pin 25 of the microcontroller, as discussed above, or a timer timing out. The timer is used to measure the various "don't care", "must not", and "next expected trigger signal" periods. When an encoded signal is successfully decoded, a "CODEMATCH" flag is set in the decoding interrupt routine 102.

The NEWSEQUENCE routine 104 is the logic for entry of a new sequence, when a first valid trigger signal is received. Here, trigger signal interrupts are disabled and the timer is set to time out at the end of the "don't care" interval. The DONTCAREDONE routine 106 is the logic for handling the interrupt caused by the timer timing out at the end of the "don't care" interval. Here, the timer is set to time out at the end of the "must not" interval.

If a trigger signal (i.e. threshold detector) interrupt is received before the end of the "must not" interval, then the signal thus far received is invalidated by executing the DONEOUT routine 108.

The MUSTNTDN routine 110 is entered when the end of the "must not" interval is signaled by the timing out of the timer. Here, the timer is set to time out at the end of the "next expected trigger signal" interval.

The RITONTIM routine 112 logic is executed when an trigger signal interrupt is received during the "next expected interrupt" interval. If a trigger signal interrupt is not received during the "next expected trigger signal" interval, then the timer times out at the end of the "next expected trigger signal" interval, causing the DONEOUT routine 108 to be executed and invalidating the thus far received acoustic signal.

A main routine 100 is an infinitely executing loop. After analyzing whether a glass break has been detected, the CODEMATCH flag is checked. If the CODEMATCH flag is set, meaning an encoded signal has been successfully decoded, then a routine is executed which generates the mode selection signal and the CODEMATCH flag is cleared. If the code match flag is not set, then an encoded acoustic signal has not been successfully decoded, and execution continues again with glass break detection analysis.

FIG. 8 is a schematic of an acoustic signal encoding device 90. Circuit block 91 is the power control block. Momentary activation of switch S2 turns on Q3, which provides power from a 9 V battery to two voltage regulators. Transistors Q2 and Q4 form a regulator which provides 6 V to power amplifier U11. Regulator U1 sources 5 V to power all other circuits. Amplifier U9A monitors battery voltage and generates a logic signal if the voltage drops below a level sufficient to maintain a calibrated output. Immediately after power is applied through the action of switch S2, sequence control logic in circuit block 98 places a high logic level on pin 3 of U2B, which holds power on after the switch is released. After the momentary closure of S1 power remains on until the power hold line goes low.

Circuit block 92 is the clock and address generator. The clock is composed of U7A and Y1, which is a 4.096 Mhz crystal. The control line at pin 3 of U7A allows the clock to be started and stopped by sequence control logic in circuit block 98. The clock drives two cascaded counters, U6 and U3, which generate addresses to the EPROM in circuit block 93. The address count begins at zero and proceeds sequentially to 32,767 at a 32 kHz rate. Additional lines from the counters are used to time events for the sequence control logic.

Circuit block 93 is an EPROM, organized as 65,536 8-bit bytes. The EPROM contains digitized waveforms for sound generation, including the sound code, the glass break simulation sound, and a voice low-battery warning. As shown in the table below, these sounds are separate waveforms stored in three parts of the EPROM address space. All sounds were originally digitized at a 32 kHz sample rate, and they are clocked out of the EPROM at a 32 kHz rate by the address generators of circuit block 72. The sounds are selected as follows: When address input A15 at pin 1 of U4 is a logic low level, the selected sound is the glass break simulation sound contained in the lower 32,768 bytes in the EPROM. When the address input A15 is a logic high level, the sound is either the sound code or the voice low battery warning. Selection between these two is accomplished by silencing the following digital-to-analog output when addresses are generated for the sound that is not desired.

0000H–7FFFH (32K) glass break simulation sound

8000H–BFFFH (16K) sound code

C000H–FFFFH (16K) voice low-battery warning

Circuit block 94 is the digital-to-analog converter. The converter itself is a commercial IC which accepts the 8-bit data from the EPROM and converts it to a proportional current. The circuit built around U9B, U9C, and U9D converts the current to a voltage and filters it to eliminate high-frequency noise from the digital circuits. Control lines at pins 12 and 13 of U10 allow the sequence control logic to silence the D/A converter for selected portions of the EPROM output.

Circuit block 95 is a power amplifier which accepts the filtered output and converts it to a low-impedance signal which is then used to drive transformer T1. Transformer T1 has a 1:8 turn ratio, producing a voltage gain of approximately eight. The maximum peak-to-peak output voltage is approximately 40 volts.

The output of the transformer drives block 96, a piezoceramic loudspeaker. The output sensitivity of this loudspeaker at 4 kHz is specified by the manufacturer as 96 dB at one-half meter for a voltage input of 2.8 V rms. Potentiometer R24 allows factory calibration of the final output level.

Circuit block 97 is a pressure wave-sensing circuit comprising an electret microphone and an amplifier with a bandpass of approximately 3 to 30 Hz. This circuit is unrelated to sound code generation. It is used in a special operating mode to trigger the glass break simulation sound when a pressure wave of sufficient amplitude is sensed. The special operating mode is called Flex and is selected at switch S3. For sound code generation switch S3 is set to Manual.

Circuit block 98 is the sequence control logic for the simulator. Based on the status of switches S1 and S3, and on timing signals derived from pins 12 and 1 of U3, this circuit block maintains power and clock control and turns the sound output on and off as required.

From the foregoing it can be seen that the signaling scheme in the present invention is based on two principles: (1) The carrier on-time is minimized in order to minimize the amount of sound energy available for reflections and reverberations; and (2) following each period of carrier on-time a suitable delay is allowed for all reflections and reverberation to decay to insignificant levels. The system based on these principles has a source transmitting a sequence of minimum-duration pulses, which are single cycles at the carrier frequency. In the preferred embodiment the carrier frequency is 4 kHz, but it may be any audio frequency compatible with the transmitter and receiver electronics. The signal information, which is a digital code, is contained in the time spacing of the pulses. The receiver detects the pulses and measure the time delay between them.

There are many ways of transmitting information using this modulation scheme. The major variables are the number of pulses transmitted and the range of durations between pulses. These choices determine the number of possible messages and the immunity of the system to false decoding of random noise. In the preferred embodiment, as disclosed in FIG. 5. Seven pulses are transmitted, producing six interpulse durations, and two discrete durations are allowed. With this system, it is theoretically possible to transmit $2^6$ or 64 different messages. In the intended application there is need to transmit only a single message, and the preferred embodiment allows decoding of only a single message. The reason for making the code more complex than necessary is to gain increased immunity to false decoding of noise. In the preferred embodiment the code actually transmitted consists of the following sequence of interpulse durations, where "short"=16 milliseconds and "long"=19 milliseconds:

Long, Short, Short, Long, Short, Long

Even with minimum-duration pulses it is necessary to allow time for reflections and reverberation to decay to insignificant levels. This problem is solved by segmenting the interpulse duration into three segments. As shown a time of 12.5 or 9.5 milliseconds immediately after the preceding pulse is a "don't care" segment. During this time the receiver ignores any received pulses, since they may be reflections. Following the "don't care" segment is a "must not" segment that extends from 6.5 milliseconds before the next expected pulse to 0.5 milliseconds before the next expected pulse. If any pulse is received during this time then the sound is not the expected code and it is disqualified. The third and final segment is the "must" segment, extending from 0.5 milliseconds before the expected pulse to 0.5 milliseconds after it. A pulse must occur in this time window or the sound is disqualified. The length of the "must" segment is based on accuracy of the clocks used. In order to keep the system simple and eliminate unnecessary sound transmissions, the source and receiver use independent but closely matched clocks. In addition, the "must" segment duration is made wide enough to allow minor motion of the source during transmission, which has the effect of changing the interpulse duration. For added noise immunity an additional "must not" segment is used at the end of the pulse sequence. This segment extends from 10 milliseconds after the seventh pulse to 50 milliseconds after the final pulse.

The noise immunity of this system is of concern, since a false decoding of spurious noise in the environment could compromise performance. A lower limit on noise immunity can be calculated as follows. Assume that the receiver is subject to a noise source which generates a series of randomly spaced pulses similar to those used in the transmission scheme. Although the pulses are randomly spaced, they have a certain mean frequency, which may be found by counting the number of pulses generated over a long time interval, and then dividing that number by the time interval. Defining the noise in this way makes it possible to calculate the probability of any given combination of interpulse durations, and also to calculate the worst-case mean frequency. The basis for this calculation is the Poisson probability distribution. For the code used in the preferred embodiment, the probability that a sequence of random pulses with the worst-case mean frequency will cause a false decoding is approximately one in 2.1 billion. If the receiver were subjected to a continuous stream of random pulses with the worst-case mean frequency, a false decoding could be expected about once every 18 months. The practical probability of a false decoding is much less, since a continuous worst case pulse stream is not a noise source ordinarily found in application environments.

What is claimed is:

1. An intrusion detector mode selection system for selecting one of a plurality of modes of operation of an intrusion detector, comprising:

an acoustic signal decoding means for receiving an encoded acoustic signal, said encoded acoustic signal comprising a plurality of spaced-apart acoustic pulses, and producing a mode selection signal in response to the spacing of said acoustic pulses; and a mode setting means for setting a mode of operation of the intrusion detector responsive to said mode selection signal.

2. An intrusion detector mode selection system as in claim 1, wherein said spaced-apart acoustic pulses are of substantially the same duration and amplitude.

3. An intrusion detector mode selection system as in claim 1, wherein said mode setting means sets said mode of operation of the intrusion detector to a second operating mode when the intrusion detector is operating in a first operating mode and to said first operating mode when said intrusion detector is operating in said second operating mode.

4. An intrusion detector mode selection system as in claim 1, wherein said acoustic signal decoding means comprises:

trigger signal generating means for generating a trigger signal responsive to a leading edge of each acoustic pulse received; and time measuring means for measuring the time between each consecutive trigger signal wherein said acoustic signal decoding means produces said mode selection signal responsive to said measured times.

5. An intrusion detector mode selection system as in claim 4, wherein said plurality of time periods are equal in time.

6. An intrusion detector mode selection system as in claim 4, wherein said plurality of time periods are not equal in time.

7. An intrusion detector mode selection system as in claim 4, wherein said acoustic signal decoding means further comprises:

comparing means for comparing said measured times to respective a priori determined time values;

wherein said acoustic signal decoding means produces said mode selection signal in the event said measured times are substantially equal to said a priori determined time values.

8. An intrusion detector mode selection system as in claim 7, wherein said acoustic signal decoding means further comprises:

a storage means for storing said a priori determined time values.

9. An intrusion detector mode selection system as in claim 1, wherein said acoustic signal decoding means comprises:

trigger signal generating means for detecting a leading edge of each acoustic pulse and generating a trigger signal responsive thereto;

first timing means for setting a first period of time after the generation of each trigger signal in response to each acoustic pulse detected;

second timing means for setting a second period of time commencing upon expiration of said first period of time and terminating before an anticipated trigger signal is to be generated, wherein said anticipated trigger signal is representative of an acoustic pulse anticipated to be received consecutive to an acoustic pulse causing the setting of the first period of time by said first timing means;

means for resetting said first timing means in response to the detection of a trigger signal during said second period of time;

wherein said acoustic signal decoding means generates said mode selection signal responsive to said anticipated trigger signal being generated after the expiration of said second period of time.

10. An intrusion detector mode selection system as in claim 9, wherein said mode setting means sets said mode of operation of the intrusion detector to a second operating mode when the intrusion detector is operating in a first operating mode and to said first operating mode when said intrusion detector is operating in said second operating mode.

11. An intrusion detector mode selection system as in claim 9, wherein said acoustic signal decoding means generates said mode selection signal after the processing of a plurality of trigger signals.

12. An intrusion detector mode selection system as in claim 9, further comprising:

third timing means for setting a third period of time commencing upon expiration of said second period of time and terminating after an a priori determined first window of time wherein said acoustic signal decoding means generates said mode selection signal responsive to said anticipated trigger signal being generated during said third period of time.

13. An intrusion detector mode selection system as in claim 12, wherein said mode setting means sets said mode of operation of the intrusion detector to a second operating mode when the intrusion detector is operating in a first operating mode and to said first operating mode when said intrusion detector is operating in said second operating mode.

14. An intrusion detector mode selection system as in claim 12, further comprising:

fourth timing means for setting a fourth period of time commencing upon detection of said anticipated trigger signal during said third period of time; and fifth timing means for setting a fifth period of time commencing upon the expiration of said fourth period of time and terminating upon the expiration of an a priori determined second window of time, wherein said resetting means resets said first timing means in response to the detection of a trigger signal during said fifth period of time, and wherein said acoustic signal decoding means generates said mode selection signal responsive to the termination of said fifth period of time.

15. An intrusion detector mode selection system as in claim 12, further comprising:

fourth timing means for setting a fourth period of time commencing upon detection of said anticipated trigger signal during said third period of time after processing a plurality of trigger signals; and fifth timing means for setting a fifth period of time commencing upon the expiration of said fourth period of time and terminating upon the expiration of an a priori determined second window of time, wherein said resetting means resets said first timing means in response to the detection of a trigger signal during said fifth period of time, and wherein said acoustic signal decoding means generates said mode selection signal responsive to the termination of said fifth period of time.

16. An intrusion detector mode selection system as in claim 15, wherein said mode setting means sets said mode of operation of the intrusion detector to a second operating mode when the intrusion detector is operating in a first operating mode and to said first operating mode when said intrusion detector is operating in said second operating mode.

17. An intrusion detector mode selection system, comprising:

an acoustic signal generating means for generating an encoded acoustic signal, said encoded acoustic signal comprising a plurality of spaced-apart acoustic pulses;

an intrusion detector comprising:

an acoustic signal detector for receiving said encoded acoustic signal; and mode selection circuit means for setting a mode of operation of said intrusion detector in response to the spacing of said acoustic pulses of the encoded acoustic signal received.

18. An intrusion detector mode selection system as in claim 17, wherein said mode selection circuit comprises:

mode setting means for setting said mode of operation of said intrusion detector to a second operating mode when said intrusion detector is operating in a first operating mode and to said first operating mode when said intrusion detector is operating in said second operating mode.

19. An intrusion detector mode selection system as in claim 17 wherein said mode selection circuit comprises:

an acoustic signal decoding means for decoding said received encoded acoustic signal and producing a mode selection signal in response thereto; and a mode setting means for setting a mode of operation of the intrusion detector responsive to said mode selection signal.

20. An intrusion detector mode selection system as in claim 19, wherein said acoustic signal decoding means comprises:

trigger signal generating means for generating a trigger signal responsive to a leading edge of each acoustic pulse received; and time measuring means for measuring the time between each consecutive trigger signal;

wherein said acoustic signal decoding means produces said mode selection signal responsive to said measured times.

21. An intrusion detector mode selection system as in claim 20, wherein said acoustic signal decoding means further comprises:

comparing means for comparing said measured times to respective a priori determined time values wherein said acoustic signal decoding means produces said mode selection signal in the event said measured times are substantially equal to said a priori determined time values.

22. An intrusion detector mode selection system as in claim 21, wherein said acoustic signal decoding means further comprises:

a storage means for storing said a priori determined time values.

23. An intrusion detection system, comprising:

receiving means for receiving an acoustic signal from an intrusion detector and for generating a first electrical signal if said acoustic signal is a first acoustic signal indicative of an intrusion and for generating a second electrical signal, comprising a plurality of trigger signals, if said acoustic signal is a second acoustic signal which comprises a plurality of spaced-apart acoustic pulses;

processing means for receiving said first electrical signal and for generating an alarm signal in response thereto and for also receiving said second electrical signal and for generating a mode selection in response to the spacing of said spaced-apart electrical pulses.

24. An intrusion detection system as in claim 23, further comprising a mode setting means that sets a mode of operation of the intrusion detector to a second operating mode when the intrusion detector is operating in a first operating mode and to said first operating mode when said intrusion detector is operating in said second operating mode.

25. An intrusion detection system as in claim 23, wherein said receiving means includes trigger signal generating means for generating a trigger signal responsive to a leading edge of each acoustic pulse of said second acoustic signal and wherein said processing means includes time measuring means for measuring the time between each consecutive trigger signal, wherein said processing means produces said mode selection signal responsive to said measured times.

26. An intrusion detection system as in claim 23 wherein said receiving means includes:

trigger signal generating means for detecting a leading edge of each acoustic pulse and generating a trigger signal responsive thereto;

and wherein said processing means includes:

first timing means for setting a first period of time after the generation of each trigger signal in response to each acoustic pulse detected;

second timing means for setting a second period of time commencing upon expiration of said first period of time and terminating before an anticipated trigger signal is to be generated, wherein said anticipated trigger signal is representative of an acoustic pulse anticipated to be received consecutive to an acoustic pulse causing the setting of the first period of time by said first timing means; and means for resetting said first timing means in response to the detection of a trigger signal during said second period of time;

wherein said processing means generates said mode selection signal responsive to said anticipated trigger signal being generated after the expiration of said second period of time.

27. An intrusion detection system as in claim 26, wherein said processing means further includes:

third timing means for setting a third period of time commencing upon expiration of said second period of time and terminating after an a priori determined first window of time wherein said processing means generates said mode selection signal responsive to said anticipated trigger signal being generated during said third period of time.

28. An intrusion detection system as in claim 27, wherein said processing means further includes:

fourth timing means for setting a fourth period of time commencing upon detection of said anticipated trigger signal during said third period of time; and fifth timing means for setting a fifth period of time commencing upon the expiration of said fourth period of time and terminating upon the expiration of an a priori determined second window of time, wherein said resetting means resets said first timing means in response to the detection of a trigger signal during said fifth period of time, and wherein said processing means generates said mode selection signal responsive to the termination of said fifth period of time.

29. An intrusion detection system as in claim 27, wherein said processing means further includes:

fourth timing means for setting a fourth period of time commencing upon detection of said anticipated trigger signal during said third period of time after processing a plurality of trigger signals; and fifth timing means for setting a fifth period of time commencing upon the expiration of said fourth period of time and terminating upon the expiration of an a priori determined second window of time, wherein said resetting means resets said first timing means in response to the detection of a trigger signal during said fifth period of time, and wherein said processing means generates said mode selection signal responsive to the termination of said fifth period of time.

* * * * *